United States Patent
Livanos et al.

(10) Patent No.: US 11,121,911 B2
(45) Date of Patent: *Sep. 14, 2021

(54) SYSTEM AND METHOD TO FACILITATE NETWORK ELEMENT FAILURE DETECTION AND SESSION RESTORATION IN A NETWORK ENVIRONMENT

(71) Applicant: Cisco Technology, Inc., San Jose, CA (US)

(72) Inventors: Konstantin Livanos, Naperville, IL (US); Ian McDowell Campbell, Bow Mar, CO (US); Charles C. Wolfinger, Littleton, CO (US)

(73) Assignee: Cisco Technology, Inc., San Jose, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 16/359,847

(22) Filed: Mar. 20, 2019

(65) Prior Publication Data

US 2019/0222471 A1    Jul. 18, 2019

Related U.S. Application Data

(63) Continuation of application No. 15/436,836, filed on Feb. 19, 2017, now Pat. No. 10,284,420.

(51) Int. Cl.
*H04L 12/24*    (2006.01)
*H04W 4/24*    (2018.01)
(Continued)

(52) U.S. Cl.
CPC ...... *H04L 41/0668* (2013.01); *H04L 12/1407* (2013.01); *H04L 43/0805* (2013.01);
(Continued)

(58) Field of Classification Search
CPC .......... H04L 41/0668; H04L 43/0805; H04L 61/203; H04W 24/04; H04W 88/16
See application file for complete search history.

(56) References Cited

U.S. PATENT DOCUMENTS

| 2013/0250838 A1 | 9/2013 | Liang et al. |
| 2014/0189137 A1* | 7/2014 | Castro Castro ....... H04L 43/028 709/228 |

(Continued)

FOREIGN PATENT DOCUMENTS

| WO | 2010015171 A1 | 2/2010 |
| WO | 2012119656 A1 | 9/2012 |
| WO | 2015044664 A1 | 4/2015 |

OTHER PUBLICATIONS

3GPP TS 23.203 V14.2.0 (Dec. 2016) Technical Specification: 3rd Generation Partnership Project; Technical Specification Group Services and System Aspects; Policy and charging control architecture (Release 14) (Year: 2016).*

(Continued)

*Primary Examiner* — Walli Z Butt
*Assistant Examiner* — Thad N Defauw
(74) *Attorney, Agent, or Firm* — Patterson + Sheridan, LLP

(57) ABSTRACT

A method is provided in one example embodiment and may include maintaining, by a Diameter Routing Agent (DRA), an availability status for a plurality of network elements; receiving a request associated with a user equipment (UE) session, wherein a first network element of the plurality of network elements is serving the UE session; determining that the first network element serving the UE session is unavailable; and re-establishing the UE session at a second network element of the plurality of network elements that is available, wherein the re-establishing is performed without terminating the UE session.

20 Claims, 11 Drawing Sheets

(51) Int. Cl.
  *H04L 12/14* (2006.01)
  *H04L 12/26* (2006.01)
  *H04M 15/00* (2006.01)
  *H04W 24/04* (2009.01)
  *H04L 29/12* (2006.01)
  *H04W 88/16* (2009.01)

(52) U.S. Cl.
  CPC ........ *H04L 43/0817* (2013.01); *H04M 15/00* (2013.01); *H04M 15/57* (2013.01); *H04M 15/66* (2013.01); *H04M 15/8228* (2013.01); *H04W 4/24* (2013.01); *H04W 24/04* (2013.01); *H04L 41/046* (2013.01); *H04L 61/203* (2013.01); *H04W 88/16* (2013.01)

(56) References Cited

U.S. PATENT DOCUMENTS

| | | | | |
|---|---|---|---|---|
| 2015/0103647 | A1* | 4/2015 | Batz | H04W 48/04 370/230 |
| 2015/0382230 | A1* | 12/2015 | Miklos | H04W 28/0205 370/230 |
| 2017/0111279 | A1* | 4/2017 | Renzullo | H04L 12/2856 |

OTHER PUBLICATIONS

Notification of Transmittal of the International Search Report and the Written Opinion of the International Searching Authority, or the Declaration for Application No. PCT/US2018017664 dated May 2, 2018.

3rd Generation Partnership Project; Technical Specification Group Core Network and Terminals; Study on PCRF failure and restoration (Release 10), 3GPP Standard ; Technical Report ; 3GPP TR 29.816, 3rd Generation Partnership Project (3GPP), Mobile Competence Centre; 650, Route Des Lucioles ; F-06921 Sophia-Antipolis Cedex ; France, vol. CT WG3, No. VI0.0.0, Oct. 1, 2010 (Oct. 1, 2010), pp. 1-63.

3GPP TS 23 203 V14.2.0 (Dec. 2016) Technical Specification: 3rd Generation Partnership Project; Technical Specification Group Services and System Aspects; Policy and charging control architecture (Release 14).

"3GPP TS 23.002 V14.0.0 (Sep. 2016) Technical Specification: 3rd Generation Partnership Project; Technical Specification Group Services and System Aspects; Network architecture (Release 14)," 3GPP, 650 Route des Lucioles—Sophia Antipolis Valbonne—France, Sep. 2016; 113 pages.

"3GPP TS 23.203 V14.2.0 (Dec. 2016) Technical Specification: 3rd Generation Partnership Project; Technical Specification Group Services and System Aspects; Policy and charging control architecture (Release 14)," 3GPP, 650 Route des Lucioles—Sophia Antipolis Valbonne—France, Dec. 2016, 256 pages.

"3GPP TS 23.272 V13.4.0 (Jun. 2016) Technical Specification: 3rd Generation Partnership Project; Technical Specification Group Services and System Aspects; Circuit Switched (CS) fallback in Evolved Packet System (EPS); Stage 2 (Release 13)," 3GPP, 650 Route des Lucioles—Sophia Antipolis Valbonne—France, Jun. 2016; 103 pages.

"3GPP TS 23.380 V14.1.0 (Dec. 2016) Technical Specification: 3rd Generation Partnership Project; Technical Specification Group Core Network and Terminals; IMS Restoration Procedures (Release 14)," 3GPP, 650 Route des Lucioles—Sophia Antipolis Valbonne—France, Dec. 2016; 43 pages.

European Examination Report for Application No. 18 707 808.4-1216 dated Aug. 25, 2020.

* cited by examiner

100

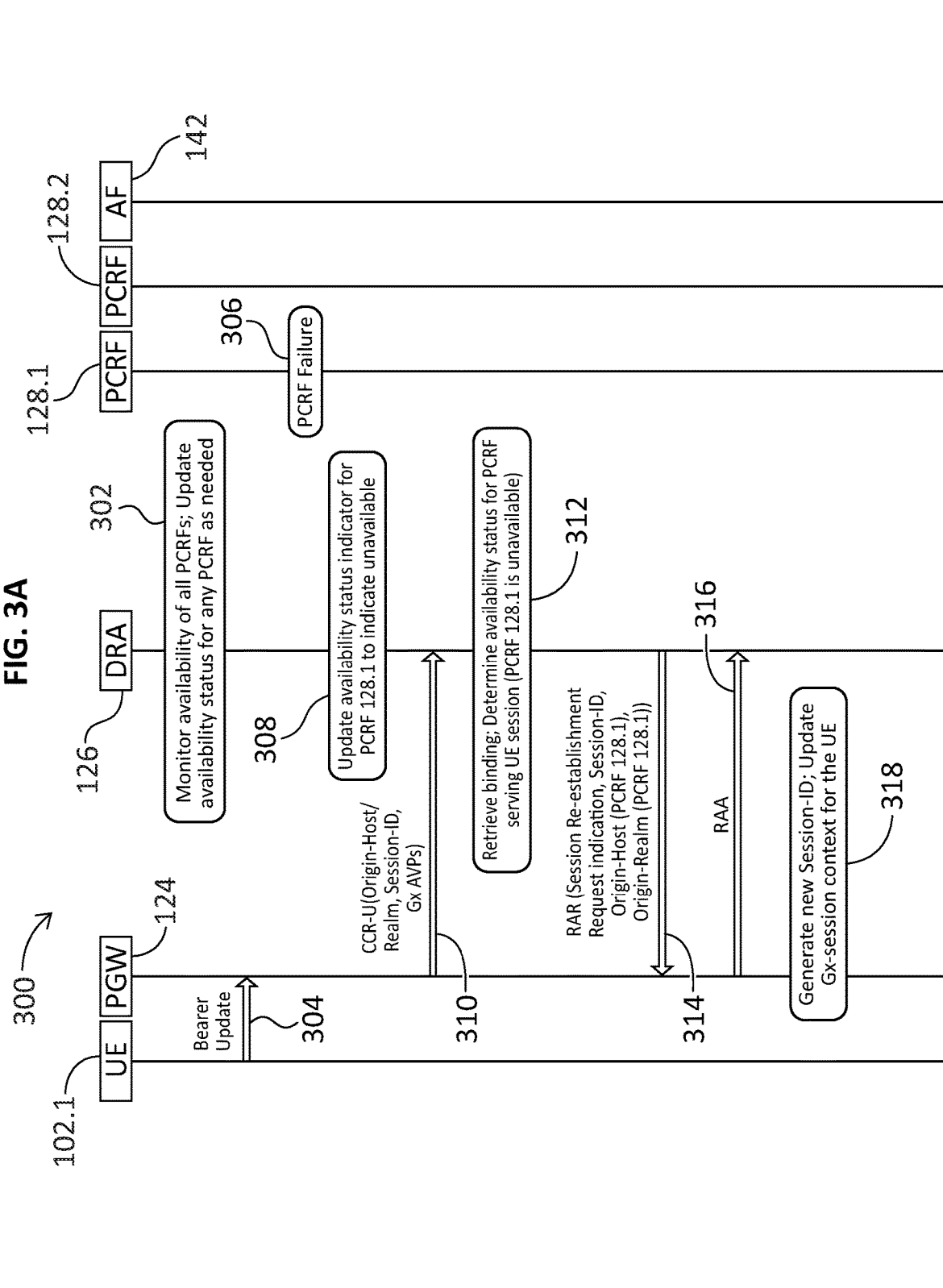

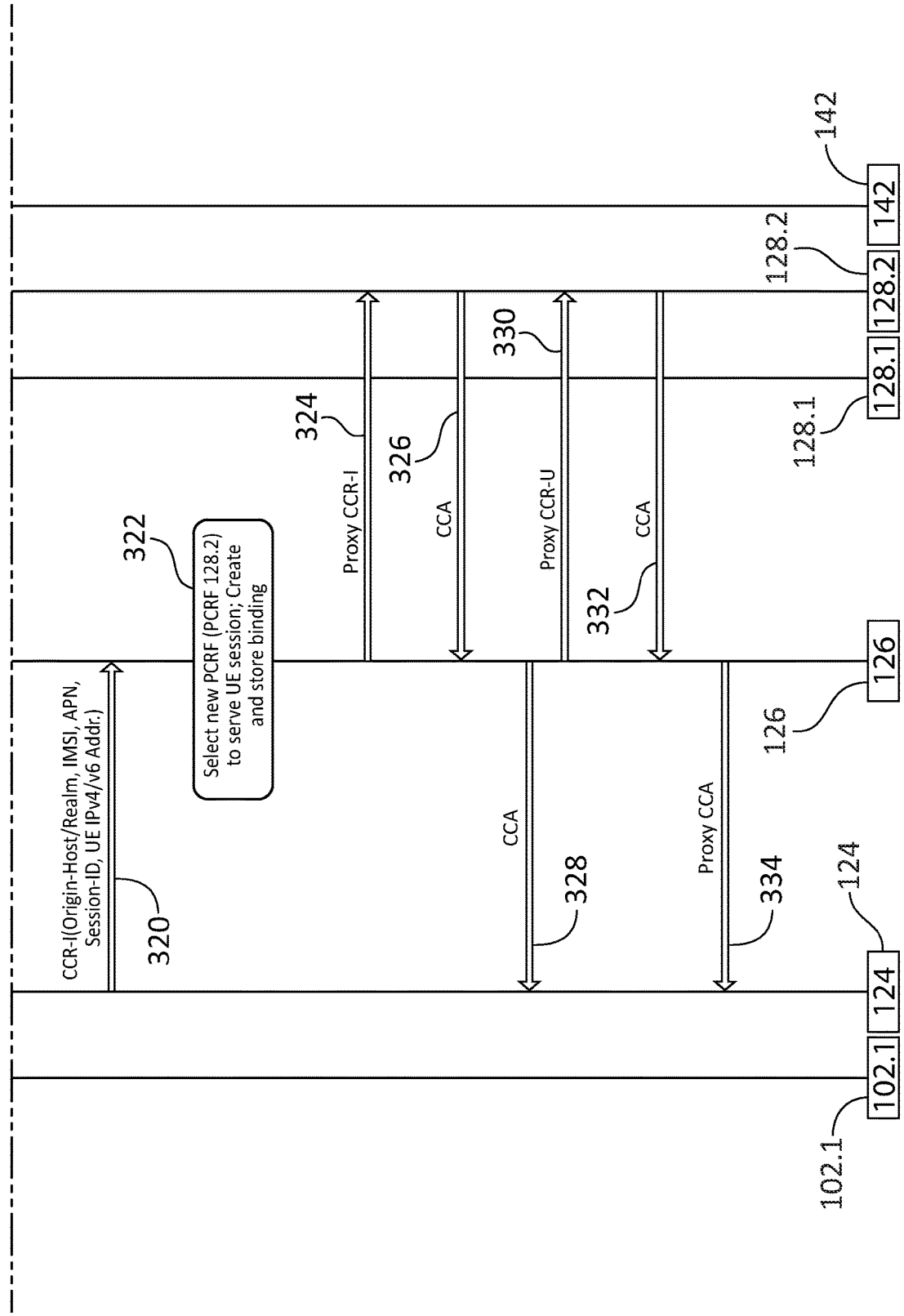

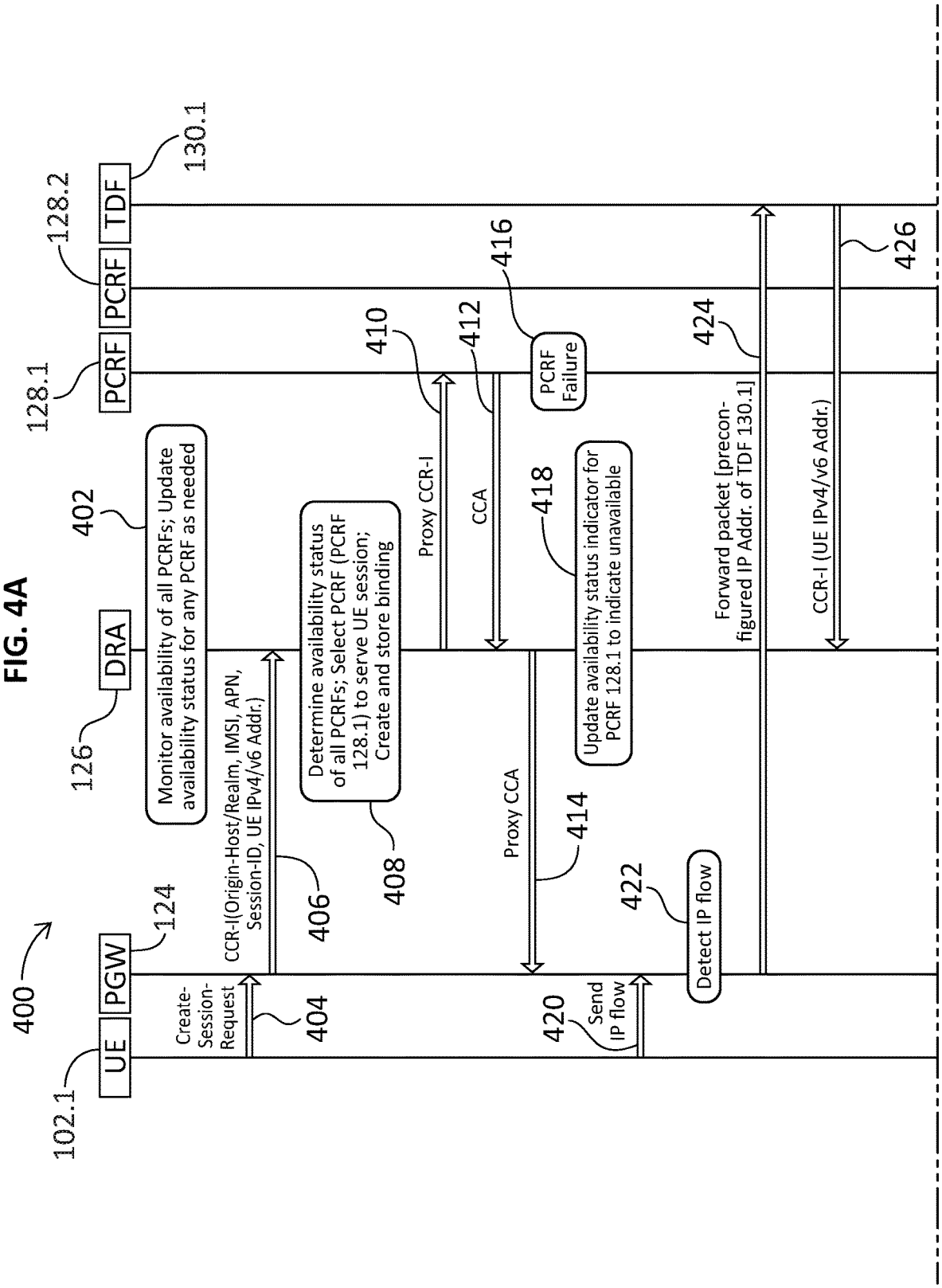

SYSTEM AND METHOD TO FACILITATE NETWORK ELEMENT FAILURE DETECTION AND SESSION RESTORATION IN A NETWORK ENVIRONMENT

CROSS-REFERENCE TO RELATED APPLICATIONS

This application is a continuation of co-pending U.S. patent application Ser. No. 15/436,836, filed Feb. 19, 2017. The aforementioned related patent application is herein incorporated by reference in its entirety.

TECHNICAL FIELD

This disclosure relates in general to the field of computer networking, and more particularly, to a system and method to facilitate network element failure detection and session restoration in a network environment.

BACKGROUND

Mobile networking architectures have grown increasingly complex in communication environments. In 3rd Generation Partnership Project (3GPP) communication networks, a network element such as a Policy and Charging Rules Function (PCRF) can aggregate information to and from network elements, systems or other sources to make policy and/or charging decisions for subscriber sessions. Some communication networks can include multiple PCRFs to provide redundancy for serving subscriber sessions. However, in current deployments when a PCRF loses subscriber information or otherwise fail before the subscriber's session is restored at another PCRF, then then a subscriber's session can "hang" or time-out causing the session to fail. Accordingly, there are significant challenges in facilitating PCRF failure detection and session restoration in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3B are a simplified interaction diagram illustrating other example details that can be associated with network element failure detection and session restoration for another example call flow in accordance with one potential embodiment of the communication system;

FIGS. 4A-4B are a simplified interaction diagram illustrating yet other example details that can be associated with network element failure detection and session restoration for another example call flow in accordance with one potential embodiment of the communication system;

DESCRIPTION OF EXAMPLE EMBODIMENTS

Overview

Figure 1:
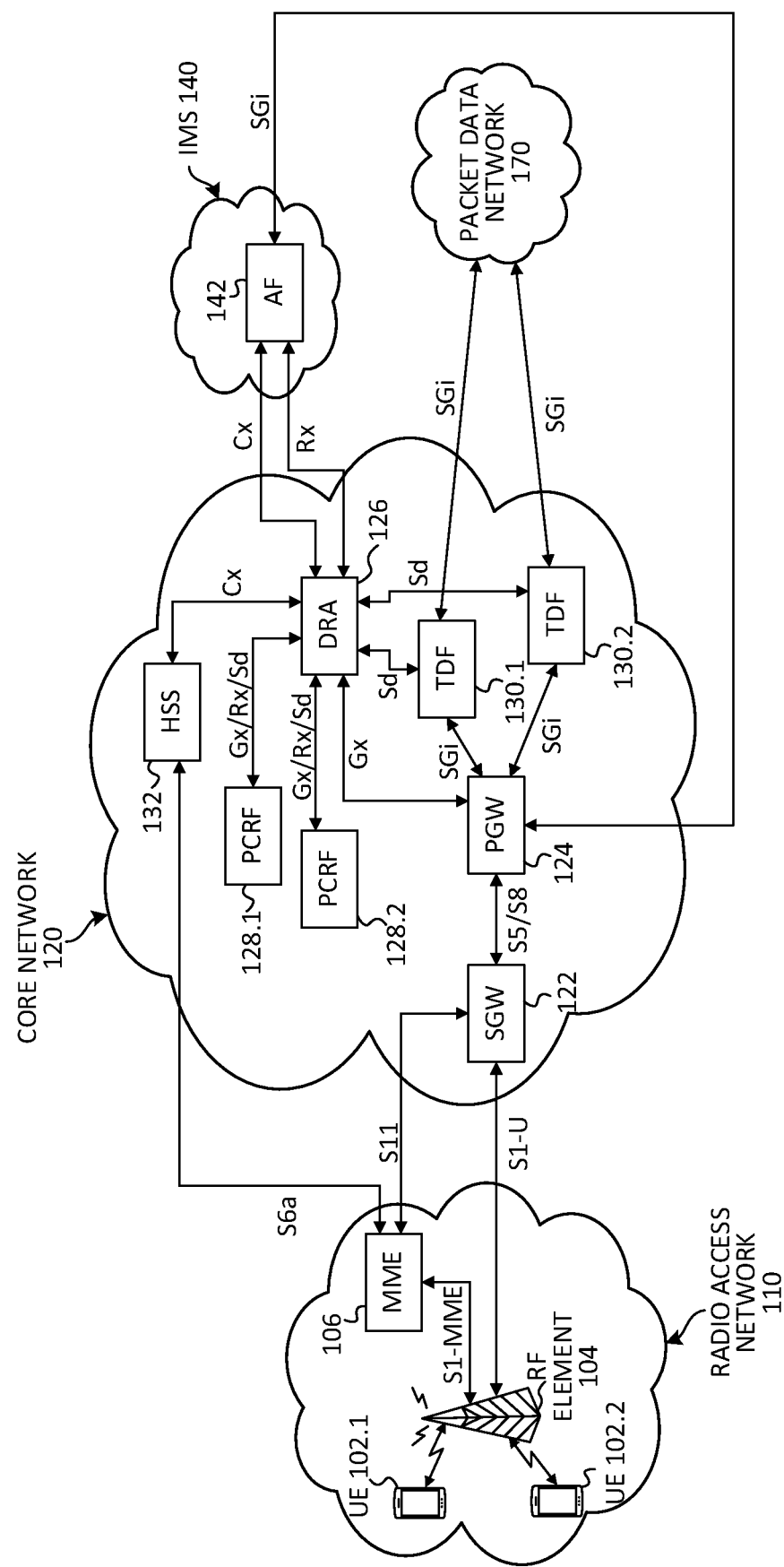
FIG. 1 is a simplified block diagram illustrating a communication system that can facilitate network element failure detection and session restoration according to one embodiment of the present disclosure.

A method is provided in one example embodiment and may include maintaining, by a Diameter Routing Agent (DRA), an availability status for a plurality of network elements; receiving a request associated with a user equipment (UE) session, wherein a first network element of the plurality of network elements is serving the UE session; determining that the first network element serving the UE session is unavailable; and re-establishing the UE session at a second network element of the plurality of network elements that is available, wherein the re-establishing is performed without terminating the UE session. In various cases, the plurality of network elements can include at least one of: a plurality of Policy and Charging Rules Functions (PCRFs); and a plurality of Traffic Detection Functions (TDFs).

In various instances, wherein the request can be at least one of: an initial Credit-Control-Request (CCR-I) message received by the DRA via a Gx interface; an update Credit-Control-Request (CCR-U) message received by the DRA via a Gx interface; an initial Credit-Control-Request (CCR-I) message received by the DRA via an Sd interface; an Authorization-and-Authentication-Request (AAR) message received by the DRA via an Rx interface; and a TDF-Session-Request (TSR) message received by the DRA via an Sd interface. In at least one instance, the determining can include: determining a respective availability status for each respective network element of the plurality of network elements based on a determination that the first network element serving the UE session is unavailable; and selecting the second network element to serve the UE session based, at least in part, on the respective availability status of the second network element indicating that it is available.

In at least one case, the re-establishing can include: communicating a Gx Re-Authorization-Request (RAR) message to a Packet Data Network (PDN) Gateway (PGW) serving the UE session; updating a session identifier for the UE session from a first session identifier to a second session identifier; and communicating the second session identifier to the DRA. In at least one case, the method can include communicating an initial Credit-Control-Request (CCR-I) message to the second network element including the second session identifier for the UE session.

In still some instances, the request can be a TDF-Session-Request (TSR) message received by the DRA from a Policy and Charging Rules Function (PCRF), wherein the plurality of network elements comprises a plurality of TDFs and the method can further include: communicating the TSR to the second network element; and communicating information to the PCRF that identifies the second network element to the PCRF. In still some instances, the request can be a TDF-Session-Request (TSR) message received by the DRA from a Policy and Charging Rules Function (PCRF), wherein the plurality of network elements comprises a plurality of TDFs and the method can further include: communicating the TSR to the second network element; communicating information to the PCRF that identifies the second network element to the PCRF; and causing packets for the UE session to be buffered at a Packet Data Network (PDN) Gateway (PGW) serving the UE session until an indication is received at the PGW indicating that the PGW is to forward the packets to the second network element.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) system architectures, sometimes referred to as 4th Generation (4G)/LTE. The following foundational information may be viewed as a basis from which the present disclosure may be properly explained. Such information is offered earnestly and for teaching purposes only and, therefore, should not be construed in a way to limit the broad applications and teachings of the present disclosure.

As referred to herein, a user equipment (UE) can be associated with a user or subscriber that may operate the UE. The terms 'UE', 'mobile device', 'mobile radio device', 'end device', 'user', 'subscriber' or variations thereof can be used herein in this Specification interchangeably. Discussions provided herein in this Specification reference communication systems capable of facilitating Internet Protocol (IP) Multimedia Subsystem (IMS) communications. IMS can provide, among other things, Voice over LTE (VoLTE) capabilities for UEs present in a communication system. VoLTE capabilities can be provided via one or more call session control functions (CSCFs), which can be referred to collectively as Session Initiation Protocol (SIP) servers. For IMS deployments, CSCFs can interface with one or more PCRF via one or more Diameter-based Rx interfaces and/or one or more Home Subscriber Server (HSS) or other similar subscriber information DB via one or more Diameter-based Cx interfaces.

An IMS deployment can include a Proxy CSCF (P-CSCF), an Interrogating CSCF (I-CSCF) and a serving CSCF (S-CSCF). Typically during operation for a VoLTE call for a given UE, the P-CSCF can serve as an entry node into the IMS and can serve as a proxy server for the given UE attempting to establish a VoLTE call via the IMS. The I-CSCF can operate to locate a given S-CSCF (e.g., multiple S-CSCFs can be present in the IMS) for the UE. Once an appropriate S-CSCF is located, the I-CSCF can remove itself from the signaling path of the UE and SIP registration/call handling can continue for the UE via the P-CSCF and the S-CSCF.

Calls and/or signaling referred to herein in this Specification can be referred to as Mobile Originating (MO) calls that can originate from or be initiated at a given UE for which a connection, typically referred to as 'termination', is sought with another UE or or as Mobile Terminating (MT) calls for which connection or termination is sought at given UE from another UE. As referred to herein in this Specification, the terms 'IMS call' and 'VoLTE call' can be used interchangeably.

In current VoLTE deployments, there is a major problem in the way ongoing IMS calls are handled when a PCRF in the network that serves or is handling the calls is down or when the session database (DB) that holds UE session binding information fails. When such issues occur, IMS calls for associated UEs will fail. As a result, user IMS sessions can hang and users cannot make and/or receive VoLTE calls unless they are forced to reattach to the network. For instance, there can be cases where a PCRF losses Rx and Gx subscriber information, which can lead to hanging voice and/or video bearers in the EPC network. In other cases, a PCRF may not be able to associate any new and/or modified voice and/or video calls for a UE, which can lead to a session being hung in the Packet Data Network (PDN) gateway (PGW) PGW of the EPC and/or the UE, where mobile terminating calls will never be able to reach the UE.

In general, a 'bearer' can refer to a path, channel, tunnel or the like through which communications can be exchanged between two endpoints for a particular service, application, etc. Typically, bearers are referred to in association to communications exchanged between a UE and one or more nodes of the EPC. At a minimum, a default bearer is established for a given UE, as defined in 3GPP standards, upon initial attachment of the UE to a given Radio Access Network (RAN) Radio Frequency (RF) element. In some embodiments, one or more dedicated bearers can be established for a given UE for one or more specialized services or applications provided to the UE such as, for example, a VoLTE session, a data session, a Voice over IP (VoIP) session, a gaming session, combinations thereof or the like.

One possible solution to remedy such issues includes using a revalidation timer-based approach to detect failures and trigger session re-establishment. For such a solution, however, mobile originating calls that have already been initiated by a UE when a failure occurs cannot be completed and the UE cannot receive and/or make calls until it is forced to reattach to the network. As referred to herein in this Specification, the terms 'session restoration' and 'session re-establishment' can be used interchangeably.

Referring to FIG. 1, FIG. 1 is a simplified block diagram illustrating a communication system 100 that can, in various embodiments as described herein, provide a system and method to facilitate network element failure detection and session restoration in a network environment according to one embodiment of the present disclosure. In at least one embodiment, communication system 100 can facilitate detection of PCRF or subscriber DB failures and restoration of Gx and Rx sessions for one or more UE through a solution that both preserves VoLTE calls for the UE and is also transparent to the UE and the IMS domain/P-CSCF. Further, communication system 100 can, in various embodiments, provide a solution for network element failure detection that can be applied to other critical communications such as, for example, enhanced Mobile Priority Services (eMPS), which is known also as Government Emergency Telecommunication Service (GETS) in the United States, and can also be applied to emergency (e.g., 911) calling.

Still further, the solution provided by communication 100 can be extended to other applications such as, for example, facilitating failure detection for Gi Local Area Network (GiLAN) Traffic Detection Function (TDF)/Deep Packet Inspection (DPI) elements and session restoration and/or Flexible Mobile Service Chaining (FMSS) failure detection and session restoration. Among other functionality, TDFs can support online (e.g., prepaid) and offline (e.g., post-paid) charging for UE sessions. If chargeable IP packets for a user connection are lost due to TDF unavailability, then the Mobile Network Operator (MNO) will not be able to charge for the service(s) provided. In accordance with at least one embodiment, as discussed in further detail herein, communication system 100 can be used to ensure revenue protection and integrity by instructing a PGW to route packets to an operational TDF in the event that the current TDF to which it is routing packets experiences a failure.

Communication system 100 can include a Radio Access Network (RAN) 110, a Core Network (CN) 120, an IMS 140 and one or more Packet Data Network (PDN) 170. RAN 110 can include users operating UE 102.1-102.2, an RF element 104 and a Mobility Management Entity (MME) 106. CN 120 can include a serving gateway (SGW) 122, a PGW 124, a Diameter Routing Agent (DRA) 126, PCRFs 128.1-128.2, TDFs 130.1-130.2 and an HSS 132. IMS 140 can include an Application Function (AF) 142.

Although only two UE 102.1-102.2 are illustrated for the embodiment of FIG. 1, it should be understood that any number of UE can be present in communication system 100 within the scope of the teachings of the present disclosure. Further, although only one RF element 104, one MME 106, one SGW 122, one PGW 124, one DRA 126, two PCRFs 128.1-128.2, two TDFs 130.1-130.2, one HSS 132 and one AF 142 are illustrated for the embodiment of FIG. 1, it should be understood that any number of these elements, gateways, agents, functions, etc. can be deployed for communication system 100 within the scope of the teachings of the present disclosure.

Each of the elements of the embodiment of FIG. 1 may couple to one another through simple interfaces or through any other suitable connection (wired or wireless), which may provide a viable pathway for network communications. As referred to herein, a physical (wired or wireless) interconnection or interface can refer to an interconnection of one element, node, function, etc. with one or more other element(s), node(s), function(s), etc. while a logical interconnection or interface can refer to communications, interactions and/or operations of elements, nodes, functions, etc. with each other that can be directly or indirectly interconnected in a network environment.

As referred to herein in this Specification, the term 'plane' can refer to a separation of traffic that can traverse a network. Three planes can typically be found in communication networks including: a data-plane, a control-plane and a management-plane. The data-plane typically carries or forwards user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

Communications in a network environment are referred to herein as 'messages', 'messaging' and/or 'signaling', which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 may implement User Datagram Protocol/Internet Protocol (UDP/IP) connections and/or Transmission Control Protocol/IP (TCP/IP) connections in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, Terminal Access Controller Access-Control System (TACACS), TACACS+, Proxy Mobile IP version 6 (PMIPv6), Proxy Mobile IP version 4 (PMIPv4), Extensible Messaging and Presence Protocol (XMPP), GPRS Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

Each respective UE 102.1-102.2 can interface with (e.g., can connect to and be served by) RF element 104 using respective over-the-air (OTA) Radio Frequency (RF) communications. RF element 104 can interface with SGW 122 via an S1-U interface. RF element 104 can further interface with MME 106 via an S1-MME interface. MME 106 can further interface with HSS 132 via an S6a interface and can further interface with SGW via an S11 interface.

SGW 122 can further interface with PGW 124 via an S5 and/or an S8 interface. In general, the S8 interface is used when a UE is roaming between different network operators and the S5 interface is a network internal interface for a given network operator. PGW 124 can further interface with each respective TDF 130.1-130.2 via a respective SGi interface, with AF 142 via a SGi interface and with DRA 126 via a Gx interface. Each respective TDF 130.1-130.2 can further interface with DRA 126 via a respective Sd interface and with one or more PDN via a respective SGi interface. AF 142 can further interface with DRA 126 via a Cx interface and an Rx interface. The DRA 126 can further interface with each respective PCRF 128.1-128.2 via respective Gx, Rx and Sd interfaces and with HSS 132 via a Cx interface. Generally, interfaces such as Gx, Rx, Cx, Sd, s6a, S1-U, S1-MME, SGi, etc. can represent reference points for certain communication protocols that can be used to facilitate communications in a network environment as generally provided in 3GPP Technical Specifications (TS) such as, for example, TS 23.002, TS 23.203, TS 29.212, TS 29.229, etc.

To facilitate PCRF failure detection and session restoration during operation in accordance with at least one embodiment of communication system 100, DRA 126 can monitor the availability of each PCRF 128.1-128.2 and maintain an availability status indicator for each PCRF 128.1-128.2. Upon receiving a policy and/or charging related request associated with a given UE session, DRA 126 can determine the availability status of the PCRF serving the UE session. Based on a determination that the availability status of the PCRF serving the UE session indicates that the PCRF is unavailable, DRA 126 can select a new PCRF to serve the UE session, create a binding for the UE session associated with the newly selected PCRF and initiate session restoration for the UE session toward PGW 124.

In various embodiments, a policy and/or charging related request associated with a given UE session that can be used to determine PCRF availability can include, but not be limited to, a Gx Credit-Control-Request (CCR) message received from a given PGW (e.g., PGW 124) associated with the UE session, an Rx Authorization-and-Authentication-Request (AAR) message received from a given AF (e.g., AF 142) associated with the UE session; and/or an Sd CCR message received from a given TDF (e.g., TDF 130.1 or TDF 130.2) associated with the UE session.

To facilitate TDF failure detection and session restoration during operation in accordance with at least one embodiment of communication system 100, DRA 126 can monitor the availability of each TDF 130.1-130.2 and maintain an availability status indicator for each TDF 130.1-130.2. Upon receiving a policy and/or charging related request related to a given UE session, DRA 126 can determine the availability status of the TDF serving the UE session. Based on a determination that the availability status of the TDF serving the UE session indicates that the TDF is unavailable, DRA 126 can select a new TDF to serve the UE session and update TDF information for the UE session at the PCRF serving the UE session based on the newly selected TDF. The PCRF serving the UE session can then information the PGW serving the UE session to direct traffic for the session toward the newly selected TDF.

In various embodiments, a policy and/or charging related request associated with a given UE session that can be used to determine TDF availability can include, but not be limited to, a Gx CCR message received from a given PGW (e.g., PGW 124) associated with the UE session; and/or an Sd CCR message received from a given TDF (e.g., TDF 130.1 or TDF 130.2) associated with the UE session.

In regards to the example architecture of communication system 100, RAN 110 can provide a communications interface between UE 102.1-102.2 and CN 120. In various embodiments, RAN 110 may include 3GPP access networks such as, for example, Global System for Mobile Communications (GSM) Enhanced Data Rates for GSM Evolution (EDGE) Radio Access Network (GERAN), generally referred to as 2nd Generation (2G); Universal Mobile Telecommunications System (UMTS) Terrestrial Radio Access Network (UTRAN), generally referred to as 3G; evolved-UTRAN (E-UTRAN), generally referred to as 4G, Long Term Evolution (LTE), LTE-Advanced (LTE-A), LTE-A Pro; and/or 5th Generation (5G) New Radio (NR) or beyond RANs. In various embodiments, RAN 110 may also include non-3GPP IP access networks such as digital subscriber line (DSL), Cable, a wireless local area network (WLAN) (e.g., 802.11 Wi-Fi), Worldwide Interoperability for Microwave Access (WiMAX)) or the Internet.

In various embodiments, any RF element (e.g., RF element 104) within communication system 100 can be configured as a Node B/Radio Network Controller (nodeB/RNC), an evolved Node B (eNodeB), a Home nodeB (HNB), a Home eNodeB (HeNB), a residential gateway (RG) or any other base station or RF element as may be defined by 3GPP standards to facilitate OTA RF communications with UE and interfacing with CN 120. MME 106 is a control-plane element that can provide tracking area list management, IDLE and ACTIVE mode UE management, bearer activation and deactivation, SGW and PGW selection for UE sessions, authentication services and other various functions, services, etc. as prescribed by 3GPP standards.

SGW 122 is a network element that can provide functionality for managing user mobility and interfaces with RAN nodes (e.g., RF elements). PGW 124 is a network element that provides IP connectivity access network (IP-CAN) session connectivity to external PDNs (e.g., one or more PDN 170 and/or IMS 140). PGW 124 may serve as policy and charging enforcement points to manage Quality of Service (QoS) functionality, online/offline flow-based charging, data generation, DPI and intercept within communication system 100.

HSS 132 can provide a subscriber database. In one sense, HSS 132 can provide functions similar to those offered by an AAA element server. When a UE moves to 3GPP access, HSS 132 can be aware of this location and the user's PDN anchor point (e.g., PGW 124). HSS 132, a given PCRF serving a given UE's session (e.g., PCRF 128.1 or 128.2) and a 3GPP AAA element can coordinate state information for the UE and synchronize this information to facilitate UE mobility within communication system 100.

PCRFs 128.1-128.2 can aggregate information to and from CN 120, operational support systems, such as IMS 140, and other sources (such as portals) in real time, supporting the creation of policy and charging rules and then automatically making policy and charging decisions for each subscriber. PCRFs 128.1-128.2 can be configured to use user subscription information as a basis for the policy and charging control decisions. The subscription information may apply for both session-based and non-session based services. During operation, PCRFs 128.1-128.2 may provision Policy and Charging Control (PCC) rules for PGW 124. Additionally, PCRFs 128.1-128.2 may determine PCC rules based on an application or service described to the PCRFs, for example, from AF 142 provisioned by a network operator within IMS 140.

DRA 126 can be deployed in communication system 100 to replace point-to-point full mesh connectivity between PCC network elements (e.g., AF 142 and PCRFs 128.1-128.2) and may provide load distribution for charging and control functions. In general during operation, DRA 126 can select a PCRF to serve a UE session and can proxy traffic on a per-Diameter session basis for the UE session. As discussed for embodiments described herein, DRA 126 can provide additional functionality to detect PCRF or subscriber DB (e.g., HSS 132) failures and facilitate session re-establishment for UE served by a failed PCRF or subscriber DB. In some embodiments, DRA 126 can also provide a proxy for communicating policy and/or charging information between multiple IP domains in communication system 100. In some embodiments, communication system 100 can be spread across different regions of a continent (e.g., regions of the United States) or across continents (e.g., spread across the United States and Europe).

In various embodiments, PCRFs 128.1-128.2 can communicate PCC rules to PGW 124 via DRA 126. Internet Engineering Task Force (IETF) has defined two DRA modes: Proxy DRA and re-direct DRA. In the proxy DRA mode, all messages are proxied via a given DRA. In the re-direct mode, only a first message (e.g., Gx session establishment) is proxied via a given DRA and subsequent messages are sent directly between a given PCRF and a Policy and Charging Enforcement Function (PCEF) (e.g., which can be provisioned for PGW 124 to provide policy and charging enforcement functionality at the PGW). Embodiments of the present disclosure are operable with both IETF DRA modes.

In certain embodiments, AF 142 can be deployed as a P-CSCF, which may serve as an entry node into IMS 140 and may provide proxy services for a given UE attempting to establish an IMS-based session (e.g., establish a VoLTE call). In various embodiments, other network elements can be provided within IMS 140 to service an IMS-based UE session, such as, for example, an I-CSCF and an S-CSCF. In general, an AF (e.g., AF 142) can describe applications/services to PCRFs 128.1-128.2 (e.g., via Information Elements (IEs)) such as, for example, media time and media description, priority, uplink/downlink requirements, application identifier, etc.) that may require dynamic policy and/or charging control for UEs. The dynamic policy and/or charging controls may include, but not be limited to, setting QoS levels and/or gating. In certain embodiments, various network access and application services can be provided for UE 102.1 and/or UE 102.1 by establishing a corresponding session for UE 102.1 and/or UE 102.2 via AF 142 within IMS 140.

In various embodiments, TDFs 130.1-130.2 can provide services for UE service data flows (SDFs), such as, for example, gating, redirection, traffic classification, online (e.g., prepaid) charging, offline (e.g., post-paid) charging, bandwidth limitations, combinations thereof or the like as described in 3GPP TS 29.212, etc. In general, charging for IP-CAN bearer session can relate to data volumes sent to and/or received by a given UE. In general, an SDF can correspond to services, applications, etc., which can be provided to a user/UE (e.g., to enhance user experience).

In various embodiments, CN 120 can include other elements such as, for example, a 3GPP Authentication, Authorization and Accounting (AAA) element; a Home Location Register (HLR); a Serving General Packet Radio Service (GPRS) Support Node (SGSN), a Gateway GPRS Support Node (GGSN); combinations thereof or any other elements, nodes, functions, etc. as may be defined by 3GPP standards. A 3GPP AAA element is a network element responsible for accounting, authorization and authentication functions for UE. An SGSN can provide similar functionality as an MME for legacy RANs such as UTRAN or GERAN.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., one or more packet data networks 170). Communication system 100 may offer communicative interfaces between various elements of communication system 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, UE 102.1-102.2 can be associated with any electronic device seeking to initiate a flow in communication system 100 via some network. In at least one embodiment, any UE 102.1-102.2 can be configured to facilitate simultaneous WLAN connectivity and 3GPP connectivity within communication system 100. The terms 'UE', 'mobile device', 'mobile radio device', 'end device', 'user', 'subscriber' or variations thereof can be inclusive of devices used to initiate a communication, such as a computer, an electronic device such as an (IoT) device (e.g., an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device or any other device, component, element, or object capable of initiating voice, audio, video, media, or data exchanges within communication system 100. UE 102.1-102.2 may also be inclusive of a suitable interface to a human user such as a microphone, a display, a keyboard, or other terminal equipment.

UE 102.1-102.2 may also be any device that seeks to initiate a communication on behalf of another entity or element such as a program, application, a database, or any other component, device, element, or object capable of initiating an exchange within communication system 100. Within communication system 100, IP addresses (e.g., for UE 102.1-102.2 or any other element in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments one or more PDN 170 can include, but not be limited to, any combination of the Internet, managed video, and/or any other Access Point Name (APN) to which UE 102.1-102.2 can connect.

Figure 2A:
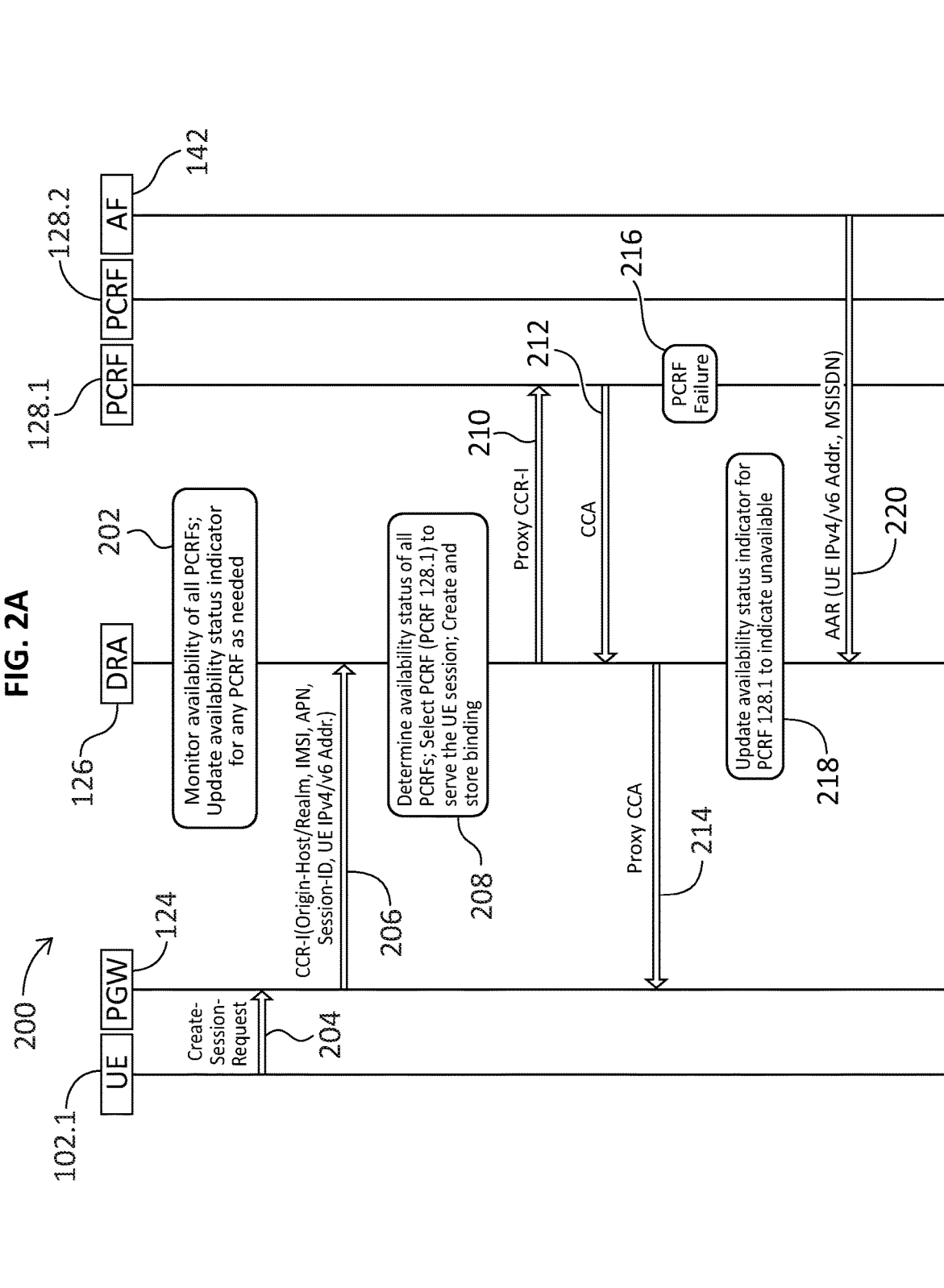
FIGS. 2A-2B are a simplified interaction diagram illustrating example details that can be associated with network element failure detection and session restoration for an example call flow in accordance with one potential embodiment of the communication system.
Figure 2B:
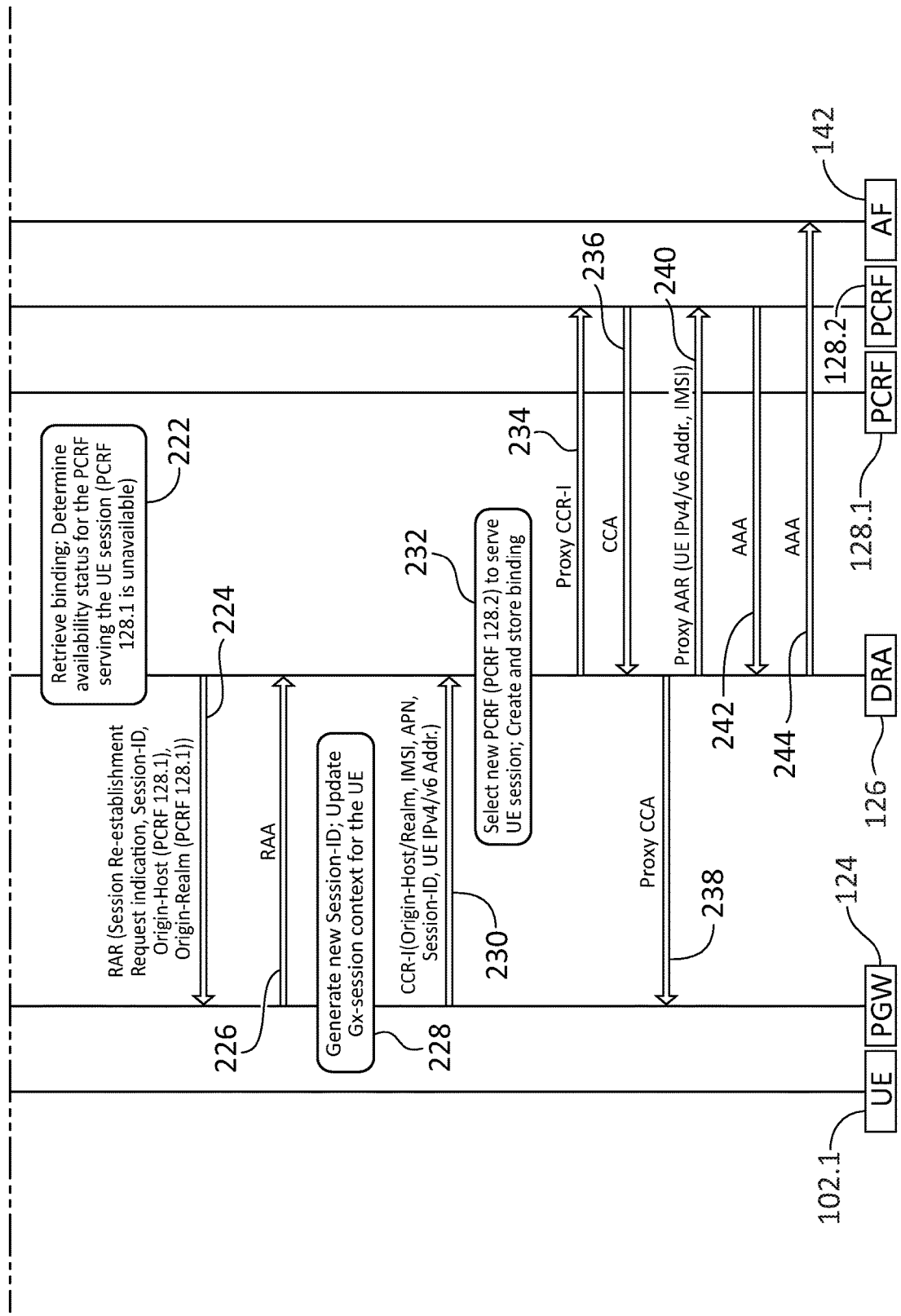

Referring to FIGS. 2A-2B, FIGS. 2A-2B are a simplified interaction diagram 200 illustrating example details that can be associated with network element failure detection and session restoration for an example call flow in accordance with one potential embodiment of communication system 100. In particular, the embodiment of FIGS. 2A-2B illustrates example details related to PCRF failure detection and Gx session re-establishment for UE 102.1. The embodiment of FIGS. 2A-2B includes UE 102.1, PGW 124, DRA 126, PCRF 128.1, PCRF 128.2 and AF 142. Although the embodiment of FIGS. 2A-2B is discussed with reference to UE 102.1, it should be understood that the example details discussed herein could be applied to any UE (e.g., UE 102.2) that may be present in communication system 100.

At 202 (and thereafter for the embodiment of FIGS. 2A-2B), DRA 126 monitors the availability of PCRFs 128.1-128.2 to handle UE sessions and updates an availability status indicator for any PCRF as may be needed (e.g., to indicate that a PCRF is available or is not available to handle UE sessions). As discussed for various embodiments described herein, a DRA (e.g., DRA 126) can monitor the availability of a set of network elements in order to maintain and update an availability list that includes an availability status indicator for each network element being monitored. In various embodiments, availability monitoring performed by a DRA can be performed on a continuous basis, on a periodic basis, on an event-driven basis, combinations thereof or the like as may be configured by a network operator.

In one embodiment, availability monitoring can be performed through Diameter watchdog monitoring as defined in the Diameter Base Protocol, Request For Comments (RFC) 6733. For Diameter watchdog monitoring, a Device-Watchdog-Request (DWR) message and a Device-Watchdog-Answer (DWA) message can be exchanged between Diameter peers to establish that a network element is reachable (e.g., available). In another embodiment, availability monitoring can be performed using Stream Control Transmission Protocol (SCTP) as defined in RFC 4960, in which endpoints can track a count of the total number of consecutive retransmissions sent to a peer endpoint to determine whether an endpoint is unreachable, can track an error count for a peer endpoint to determine whether the peer endpoint is active or inactive (e.g., available or unavailable) and/or can monitor a peer endpoint using heartbeat monitoring to determine whether the peer endpoint is active or inactive. In various embodiments, any status request/response messaging, heartbeat monitoring, combinations thereof or the like can be used to monitory availability of network elements by a given DRA.

In at least one embodiment, an availability status indicator can be set for each network element (e.g., PCRF, TDF, etc.) for an availability list that includes a set of network elements for which availability is being monitored in order to indicate the availability status of each network element. In various embodiments, an availability status indicator can be any flag, bit, bit sequence or the like that can be set to a value that can represent a status indication. For purposes of embodiments discussed herein, a 'list' can include any list, table, database, combinations thereof or the like that can be used to organize and store data. In some embodiments, different types of network elements (e.g., PCRFs, TDFs, etc.) being monitored can be maintained in a single availability list. In other embodiments, a different availability list can be maintained for each different network element type being monitored.

In at least one embodiment, an availability list can include a network element identifier (ID) for a given network element and a corresponding availability status indicator for the network element that can be paired together in a two-tuple format such as [ID, STATUS] where ID represents the network element ID for a given network element being monitored and STATUS represents the availability status indicator of the network element. In various embodiments, a network element ID can be represented using numeric values, alphabetic values, alphanumeric values, bit sequences, IP addresses, combinations thereof or the like. In various embodiments, a status indicator can be set to a first value say, for example, a value of '1' to indicate that a network element (e.g., PCRF) is available, up, working, etc. and the status indicator can be set to a second value say, for example, a value of '0' to indicate that a network is unavailable, down, unreachable, etc. for a network element availability list, table. Other status indicators can be used to maintain an availability status for network elements being monitored.

It is assumed for the purposes of the embodiment of FIGS. 2A-2B, that DRA performs the availability monitoring throughout the operations and interactions discussed for the embodiment of FIGS. 2A-2B. At 204, it is assumed for the embodiment of FIGS. 2A-2B that a Create-Session-Request message associated with UE 102.1 is sent to PGW 124. Although not shown for the embodiment of FIGS. 2A-2B, it is assumed the messaging at 204 includes UE 102.1 sending an Attach-Request message to MME 106, which sends the Create-Session-Request message to PGW 124 via SGW 122. At 206, PGW 124 sends a Gx Initial-Credit-Control-Request (CCR-I) message to DRA 126. The CCR-I sent at 206 includes, among other information (e.g., as defined by standards), an Origin-Host Attribute Value Pair (AVP) and an Origin-Realm AVP for PGW 124, an IMSI for the subscriber associated with UE 102.1, an APN for the APN (e.g., PDN 170, IMS 140, etc.) to which UE 102.1 is seeking to connect, a Session-ID for the UE 102.1 session as generated by PGW 124 and an IPv4 or IPv6 address (IPv4/v6 Addr.) assigned to UE 102.1 by PGW 124. An Origin-Host AVP is typically used to identify the endpoint from which a Diameter message originates and the Origin-Realm AVP is typically used to identify the realm of the originator of a Diameter message. A realm is typically associated with an IP domain in which a Diameter network element is deployed.

At 208, DRA 126 determines the availability status of all PCRFs (e.g., PCRF 128.1=available and PCRF 128.2=available), selects a PCRF to serve the UE 102.1 session and creates and stores a binding associating the PGW and the selected PCRF for the UE 102.1 session. In at least one embodiment, the binding can be associated with the Mobile Station International Subscriber Directory Number (MSISDN) for the subscriber associated with UE 102.1. For purposes of the embodiment of FIGS. 2A-2B, it is assumed that DRA 126 selects PCRF 128.1 to initially handle the UE session. The PCRF can be identified using a Destination-Host AVP and a Destination-Realm AVP for Diameter messaging that is to be proxied to the PCRF from another network element (e.g., PGW 124). In at least one embodiment the binding can be represented as {Origin-Host/Realm, IMSI, APN, Session-ID, IPv4/v6 Addr, PCRF 128.1 [Destination-Host; Destination-Realm]}. DRA 126 proxies (e.g., sends) the CCR-I including the (Origin-Host/Realm, IMSI, APN, Session-ID, IPv4/v6 Addr.) to PCRF 128.1 at 210 and PCRF 128.1 responds with a Credit-Control-Answer (CCA) message at 212. DRA 126 proxies the CCA to PGW 124 at 214.

Recall, DRA 126 is continually monitoring the availability status of PCRFs 128.1-128.2. At 216, it is assumed that a failure occurs for PCRF 128.1. Following the failure, DRA 126 updates the availability status indicator for PCRF 128.1 at 218 to indicate that PCRF 128.1 is unavailable. It should be noted that the timing of the PCRF failure as shown in the embodiment of FIGS. 2A-2B is provided for illustrative purposes only in order to discuss various features of communication system 100. It should be understood that a failure and/or recovery (e.g., coming back on-line) for a given PCRF can occur at any time, can be detected by DRA 126 and the DRA can update the corresponding availability status indicator for the given PCRF within the scope of the teachings discussed herein in this Specification.

At 220, it is assumed that AF 142 sends an Rx Authorization-and-Authentication-Request (AAR) message to DRA 126 including the IPv4/v6 address for UE 102.1 and the MSISDN for the subscriber associated with UE 102.1 to provide PCRF 128.1 with session information for the UE 102.1 session (e.g., to request information associated with the UE session, etc.). In at least one embodiment, the Rx AAR message can be sent to request QoS resource authorization for UE 102.1 connection. For VoLTE, the PCRF can request the allocation of a dedicated bearer over the Gx connection to the PGW.

Using the IPv4/v6 address and the MSISDN for UE 102.1, DRA 126 retrieves the binding for the UE 102.1 session that was stored at 208 and determines the availability status for PCRF 128.1 serving the UE session at 222. As noted previously, the availability status indicator for PCRF 128.1 was set to indicate that the PCRF is unavailable at 218; thus, DRA 126 determines that the PCRF 128.1 is unavailable and that a new PCRF is to be selected to handle the UE session.

The determination at 222 that PCRF 128.1 is unavailable triggers DRA 126 to send PGW 124 a Gx Re-Authorization-Request (RAR) message at 224 that includes, among other information, a Session Re-establishment Request indication, the Session-ID for UE 102.1 as was received from PGW 124 at 206, the Origin-Host AVP for PCRF 128.1 and the Origin-Realm AVP for PCRF 128.1, which the DRA learned via the CCA received at 212. PGW 124 responds to DRA 126 with a Gx Re-Authorization-Answer (RAA) message at 226 and, at 228, the PGW generates a new Session-ID for the UE 102.1 session and updates the Gx-session context for the UE using the newly generated Session-ID for UE 102.1.

At 230, PGW 124 sends another CCR-I message to DRA 126 that includes, among other information, the Origin-Host AVP and the Origin-Realm AVP for PGW 124, the IMSI for the subscriber associated with UE 102.1, the APN for the UE 102.1 session, the newly generated Session-ID for the UE 102.1 session and the IPv4 or IPv6 address (IPv4/v6 Addr.) assigned to UE 102.1 by PGW 124. At 232, DRA 126 selects another PCRF, PCRF 128.2, to serve the UE 102.1 session and creates and stores a binding associating the PGW and the newly selected PCRF 128.2 for the UE 102.1 session. In various embodiments, a DRA can select a new network element to serve a UE session using any combination of: availability status indicators for various network element types, Host/Realm information, load (e.g., to balance load), network topology, combinations thereof or the like. DRA 126 proxies the CCR-I including the (Origin-Host/Realm, IMSI, APN, Session-ID, IPv4/v6 Addr.) to PCRF 128.2 at 234 and PCRF 128.2 responds with a Credit-Control-Answer (CCA) message at 236. DRA 126 proxies the CCA message to PGW 124 at 238.

At 240, DRA 126 proxies the Rx AAR that was received from AF 142 at 224 to PCRF 128.2. At 242, PCRF 128.2 responds to the AAR with AAA information for the UE 102.1 session and DRA 126 proxies the information to AF 142 at 244. Processing can continue therefrom by communicating a Create-Session-Response message to the MME and an Attach-Accept message to UE 102.1. This messaging is not shown in FIG. 2B in order to illustrate other features for communication system 100. Accordingly, communication system 100 can facilitate PCRF failure detection and Gx session re-establishment for a UE session in a manner that is transparent to the UE such that the UE is not required to re-connect to the network following the PCRF failure in accordance with one potential embodiment. The solution provided by communication system 100 is also transparent to both the Gx and Sd (PULL) interfaces and, by extension, to the applications supported over them.

In at least one embodiment, network element failure detection and session re-establishment that can be provided by communication system 100 can advantageously preserve critical communications when a serving network element (e.g., PCRF) fails that can enable a network operator to provide the same Quality of Experience (QoE) as the Circuit Switched Network, which is typically known for its high availability and reliability, that may lead to greater acceptance of VoLTE. Further, because the solution provided by communication system 100 is transparent to both UEs and the IMS Domain (e.g., P-CSCF), signaling efficiencies can be realized by not requiring a UE to re-connect to the network in the event of a PCRF and/or TDF failure. Further signaling efficiencies can be realized by communication system 100, which does not require the implementation of revalidation timers.

In at least one embodiment, network element failure detection and session re-establishment that can be provided by communication system 100 can further advantageously support Federal Communications Commission (FCC) Network Reliability and Service Continuity (NRSC) requirements, which are used to monitor the performance of network operators and service carriers in the United States. The loss of a PCRF is a major network element event that can lead to service discontinuity and/or disruption. The solution provided by communication system 100 can be used to ensure service continuity and compliance with NRSC requirements.

In at least one embodiment, network element failure detection and session re-establishment that can be provided by communication system 100 can further advantageously be applied to FMSS deployments to provide for efficient optimization of network resources. In an FMSS deployments, a user's IP flow can be subjected to various optimizations such as, for example, video optimizations, audio optimizations, firewalling, DPI, etc. For example a video optimizer server can optimize a video signal based on the RAN type (e.g., 3G, 4G, 5G, etc.), user profile, network congestion, combinations thereof or the like. Embodiments of communication system 100 as may be applied to FMSS deployments can be used to ensure that an operational FMSS node is selected, which can result in both better user QoE and network utilization.

As referred to herein in this Specification, an 'IP flow' can refer to a sequence of packets that can be identified using a flow information (generally referred to as a 'flow mask') such as, for example, a 2-tuple, a 5-tuple, a 6-tuple, a 7-tuple flow mask or any other flow mask that can provide for consistent identification of each packet belonging to a particular IP flow. A 2-tuple flow mask can identify a source IP address and a destination IP address for a packet. A 5-tuple flow mask can identify a source-IP address, a destination IP address, a source port, a destination port and a transport protocol for a packet. A 6-tuple flow mask can include tunnel endpoint identifier information in addition to 5-tuple flow mask information. A 7-tuple flow mask can include an attachment circuit identifier (e.g., virtual local area network (VLAN) identifier, Multiprotocol Label Switching (MPLS) label, etc.) in addition to 6-tuple flow mask. Other flow mask can be envisioned and/or may be standardized for IP packets by standard setting organizations such as 3GPP, IETF, Institute of Electrical and Electronics Engineers (IEEE), European Telecommunications Standards Institute (ETSI) or the like in accordance with various embodiments described herein.

Referring to FIGS. 3A-3B, FIGS. 3A-3B are a simplified interaction diagram 300 illustrating other example details that can be associated with network element failure detection and session restoration for another example call flow in accordance with one potential embodiment of communication system 100. In particular, the embodiment of FIGS. 3A-3B illustrates example details related to PCRF failure detection and Gx session re-establishment for UE 102.1 for a bearer update use case. The embodiment of FIGS. 3A-3B includes UE 102.1, PGW 124, DRA 126, PCRF 128.1, PCRF 128.2 and AF 142. Although the embodiment of FIGS. 3A-3B is discussed with reference to UE 102.1, it should be understood that the example details discussed herein could be applied to any UE (e.g., UE 102.2) that may be present in communication system 100. It is assumed for the purposes of the embodiment of FIGS. 3A-3B that UE 102.1 is already connected to the network (e.g., via RF element 104, etc.) and that DRA 126 has created and stored a session binding for the UE 102.1 session.

At 302 (and thereafter for the embodiment of FIGS. 3A-3B), DRA 126 monitors the availability of PCRFs 128.1-128.2 to handle UE sessions and updates an availability status indicator for any PCRF as may be needed (e.g., to indicate that a PCRF is available or is not available to handle UE sessions). The monitoring at 302 can be performed using operations as discussed for various embodiments described herein and can be performed by the DRA throughout the operations and interactions discussed for the embodiment of FIGS. 3A-3B. At 304, it is assumed for the embodiment of FIGS. 3A-3B that UE 102.1 sends a Bearer-Update message to PGW 124 (e.g., via RF element 104 and SGW 122). At 306, it is assumed that a failure occurs for PCRF 128.1. Following the failure, DRA 126 updates the availability status indicator for PCRF 128.1 at 308 to indicate that PCRF 128.1 is unavailable. It should be noted that the timing of the PCRF failure as shown in the embodiment of FIGS. 3A-3B is provided for illustrative purposes only in order to discuss various features of communication system 100. It should be understood that a failure and/or recovery (e.g., coming back on-line) for a given PCRF can occur at any time, can be detected by DRA 126 and the DRA can update the corresponding availability status indicator for the given PCRF within the scope of the teachings discussed herein in this Specification.

At 310, PGW 124 sends a Gx Update Credit-Control-Request (CCR-U) message to DRA 126 including among other information, the Origin-Host AVP and the Origin-Realm AVP for PGW 124, the IMSI for the subscriber associated with UE 102.1, the APN for the APN to which UE 102.1 is connected, the Session-ID for the UE 102.1 session and the IPv4 or IPv6 address (IPv4/v6 Addr.) assigned to UE 102.1 by PGW 124. At 312, DRA 126 retrieves the session binding for the UE 102.1 session and determines the availability status for PCRF 128.1 serving the UE 102.1 session. As noted previously, the availability status indicator for PCRF 128.1 was set to indicate that the PCRF is unavailable at 308; thus, DRA 126 determines at 312 that the PCRF 128.1 is unavailable and that a new PCRF is to be selected to handle the UE session.

The determination at 312 that PCRF 128.1 is unavailable triggers DRA 126 to send PGW 124 a Gx RAR message at 314 that includes, among other information, a Session Re-establishment Request indication, the current Session-ID for UE 102.1, the Origin-Host AVP for PCRF 128.1 and the Origin-Realm AVP for PCRF 128.1. PGW 124 responds to DRA 126 with a Gx RAA message at 316 and, at 318, the PGW generates a new Session-ID for the UE 102.1 session and updates the Gx-session context for the UE using the newly generated Session-ID for the UE 102.1.

At 320, PGW 124 sends another CCR-I message to DRA 126 that includes, among other information, the Origin-Host AVP and the Origin-Realm AVP for PGW 124, the IMSI for the subscriber associated with UE 102.1, the APN for the APN to which UE 102.1 is connected, the newly generated Session-ID for the UE 102.1 session and the IPv4 or IPv6 address (IPv4/v6 Addr.) assigned to UE 102.1 by PGW 124. At 322, DRA 126 selects another PCRF, PCRF 128.2, to serve the UE 102.1 session and creates and stores a binding associating the PGW and the newly selected PCRF 128.2 for the UE 102.1 session. DRA 126 proxies the CCR-I including the (Origin-Host/Realm, IMSI, APN, Session-ID, IPv4/v6 Addr.) to PCRF 128.2 at 324 and PCRF 128.2 responds with a CCA message at 326. DRA 126 proxies the CCA message to PGW 124 at 328.

At 330, DRA proxies the Gx CCR-U message that was received from PGW 124 at 310 to PCRF 128.1. PCRF 128.2 responds with a CCA message at 332 and DRA 126 proxies the CCA message to PGW 124 at 334. Thus, communication system 100 can facilitate PCRF failure detection and Gx session re-establishment for a given UE session in a manner that is transparent to the UE such that the UE is not required to re-connect to the network following the PCRF failure for a bearer update use case involving the UE session in accordance with one potential embodiment.

Figure 4B:
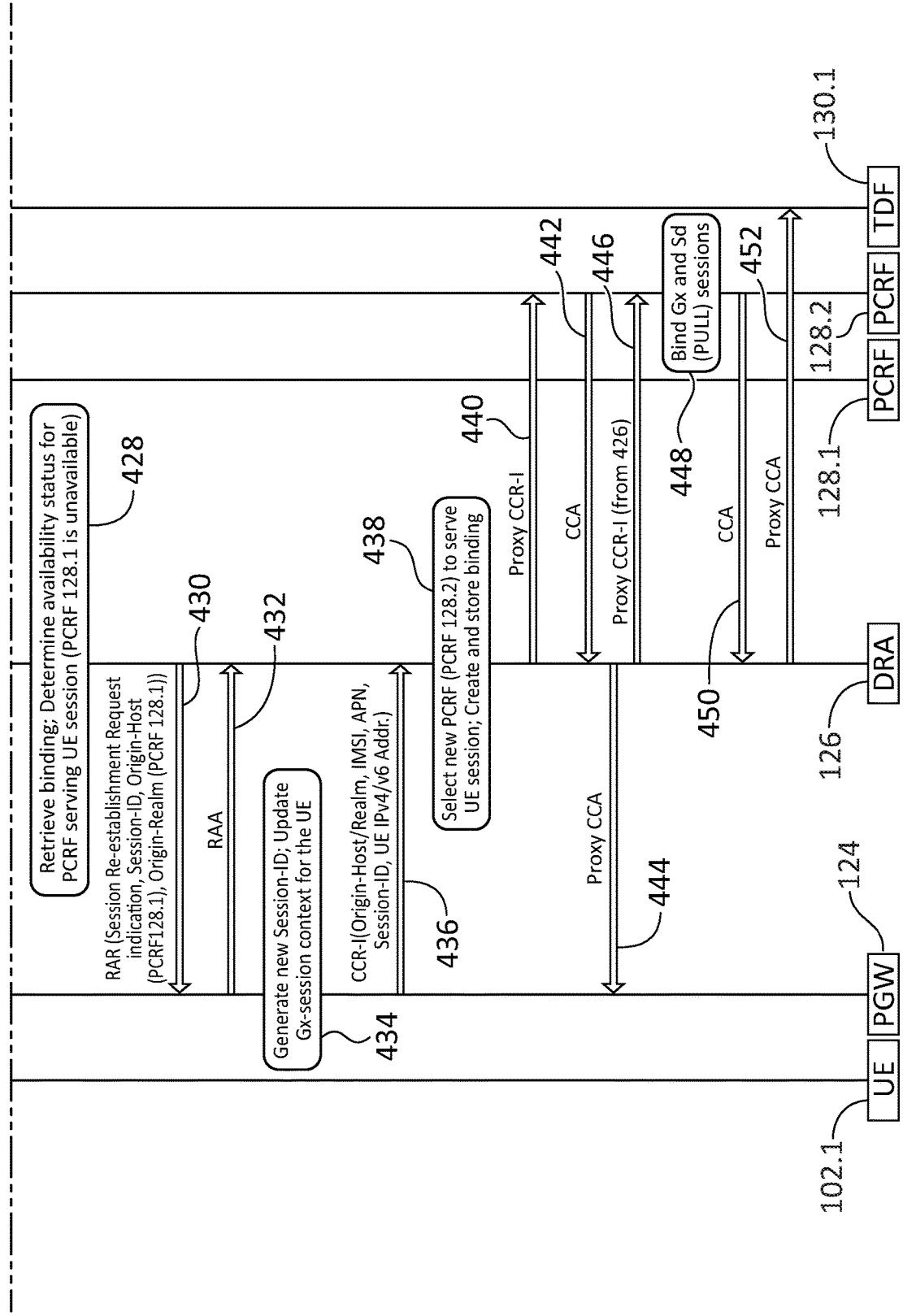

Referring to FIGS. 4A-4B, FIGS. 4A-4B are a simplified interaction diagram 400 illustrating yet other example details that can be associated with network element failure detection and session restoration for another example call flow in accordance with one potential embodiment of communication system 100. In particular, the embodiment of FIGS. 4A-4B illustrates example details related to PCRF failure detection and Gx session restoration for UE 102.1 for an Sd PULL use case involving a given TDF (e.g., TDF 130.1) serving the UE session. The embodiment of FIGS. 4A-4B includes UE 102.1, PGW 124, DRA 126, PCRF 128.1, PCRF 128.2 and TDF 130.1. Although the embodiment of FIGS. 4A-4B is discussed with reference to UE 102.1, it should be understood that the example details discussed herein could be applied to any UE (e.g., UE 102.2) that may be present in communication system 100.

In some cases, provisioning PCC rules and/or other UE session information for a network element can be performed using a PULL procedure in which the network element solicits provisioning of the rules and/or information (e.g., sends a request to a PCRF serving a UE session for rules and/or information for the session). In other cases, provisioning PCC rules and/or other UE session information for a network element using a PUSH procedure in which provisioning of the network element is unsolicited by the network element (e.g., a PCRF serving a UE session initiates sending rules and/or information for the session to a network element without receiving a request from the network element). The embodiment of FIGS. 4A-4B illustrates example details that can be associated with a PULL use case performed via the Sd interface for TDF 130.1. For purposes of the embodiment of FIGS. 4A-4B, it is assumed that PGW 124 is preconfigured with the IP address of TDF 130.1 such that the PGW can forward uplink IP flows to the TDF and receive downlink IP flows from the TDF during operation.

At 402 (and thereafter for the embodiment of FIGS. 4A-4B), DRA 126 monitors the availability of PCRFs 128.1-128.2 to handle UE sessions and updates an availability status indicator for any PCRF as may be needed (e.g., to indicate that a PCRF is available or is not available to handle UE sessions). The monitoring at 402 can be performed using operations as discussed for various embodiments described herein and can be performed by the DRA throughout the operations and interactions discussed for the embodiment of FIGS. 4A-4B. At 404, it is assumed for the embodiment of FIGS. 4A-4B that a Create-Session-Request message associated with an Attach-Request message from UE 102.1 is sent to PGW 124.

At 406, PGW 124 sends a Gx CCR-I message to DRA 126. The CCR-I sent at 406 includes, among other information, an Origin-Host AVP and an Origin-Realm AVP for PGW 124, an IMSI for the subscriber associated with UE 102.1, an APN for the APN (e.g., PDN 170, IMS 140, etc.) to which UE 102.1 is seeking to connect, a Session-ID for the UE 102.1 session as generated by PGW 124 and an IPv4 or IPv6 address (IPv4/v6 Addr.) assigned to UE 102.1 by PGW 124. At 408, DRA 126 determines the availability status of all PCRFs (e.g., PCRF 128.1=available and PCRF 128.2=available), selects a PCRF to serve the UE 102.1 session and creates and stores a binding associating the PGW and the selected PCRF for the UE 102.1 session. For purposes of the embodiment of FIGS. 4A-4B, it is assumed that DRA 126 selects PCRF 128.1 to initially handle the UE session.

DRA 126 proxies the CCR-I including the (Origin-Host/Realm, IMSI, APN, Session-ID, IPv4/v6 Addr.) to PCRF 128.1 at 410 and PCRF 128.1 responds with a CCA message at 412, which DRA 126 proxies to PGW 124 at 414. Recall, DRA 126 is continually monitoring the availability status of PCRFs 128.1-128.2. At 416, it is assumed that a failure occurs for PCRF 128.1. Following the failure, DRA 126 updates the availability status indicator for PCRF 128.1 at 418 to indicate that PCRF 128.1 is unavailable. It should be noted that the timing of the PCRF failure as shown in the embodiment of FIGS. 4A-4B is provided for illustrative purposes only in order to discuss various features of communication system 100. It should be understood that a failure and/or recovery for a given PCRF can occur at any time, can be detected by DRA 126 and the DRA can update the corresponding availability status indicator for the given PCRF within the scope of the teachings discussed herein in this Specification.

At 420, it is assumed for the embodiment of FIGS. 4A-4B, that UE 102.1 initiates sending an IP flow (e.g., packets) to PGW 124. At 422, PGW 124 detects the IP flow and begins to forward the packets to TDF 130.1 at 424 using the preconfigured IP address of TDF 130.1. Upon receiving the packet for the UE 102.1 session, TDF 130 sends at 426 a CCR-I to DRA 126 including, at least in part, the IPv4 or IPv6 address for UE 102.1 to retrieve PCC rules and/or other information from the PCRF serving the UE 102.1 session.

Using the IPv4/v6 address and/or other information (e.g., the IMSI for UE 102.1), DRA 126 retrieves the binding for the UE 102.1 session that was stored at 408 and determines the availability status for PCRF 128.1 serving the UE session at 428. As noted previously, the availability status indicator for PCRF 128.1 was set to indicate that the PCRF is unavailable at 418; thus, DRA 126 determines at 428 that the PCRF 128.1 is unavailable and that a new PCRF is to be selected to handle the UE session. The determination at 428 that PCRF 128.1 is unavailable triggers DRA 126 to send PGW 124 a Gx RAR message at 430 that includes, among other information, a Session Re-establishment Request indication, the Session-ID for UE 102.1 as was received from PGW 124 at 406, the Origin-Host AVP for PCRF 128.1 and the Origin-Realm AVP for PCRF 128.1.

PGW 124 responds to DRA 126 with a Gx RAA message at 432 and, at 434, the PGW generates a new Session-ID for the UE 102.1 session and updates the Gx-session context for the UE using the newly generated Session-ID for UE 102.1. At 436, PGW 124 sends another CCR-I message to DRA 126 that includes, among other information, the Origin-Host AVP and the Origin-Realm AVP for PGW 124, the IMSI for the subscriber associated with UE 102.1, the APN for the UE 102.1 session, the newly generated Session-ID for the UE 102.1 session and the IPv4 or IPv6 address (IPv4/v6 Addr.) assigned to UE 102.1 by PGW 124. At 438, DRA 126 selects another PCRF, PCRF 128.2, to serve the UE 102.1 session and creates and stores a binding associating the PGW and the newly selected PCRF 128.2 for the UE 102.1 session.

DRA 126 proxies the CCR-I including the (Origin-Host/Realm, IMSI, APN, Session-ID, IPv4/v6 Addr.) to PCRF 128.2 at 440 and PCRF 128.2 responds with a CCA message at 442, which DRA 126 proxies to PGW 124 at 444. At 446, DRA proxies the CCR-I message that was received from TDF 130.1 (at 426) to PCRF 128.1. At 448, PCRF 128.2 binds the Gx and Sd (PULL) sessions for the UE 102.1 session. At 450, PCRF 128.2 sends a CCA to DRA 126, which the DRA proxies to TDF 130.1 at 452. Processing can continue therefrom by communicating a Create-Session-Response message to the MME and an Attach-Accept message to UE 102.1. This messaging is not shown in FIG. 4B in order to illustrate other features for communication system 100. Accordingly, communication system 100 can facilitate PCRF failure detection and Gx session re-establishment for a given UE session in a manner that is transparent to the UE such that the UE is not required to re-connect to the network following the PCRF failure for an Sd PULL use cases in accordance with one potential embodiment.

Figure 5:
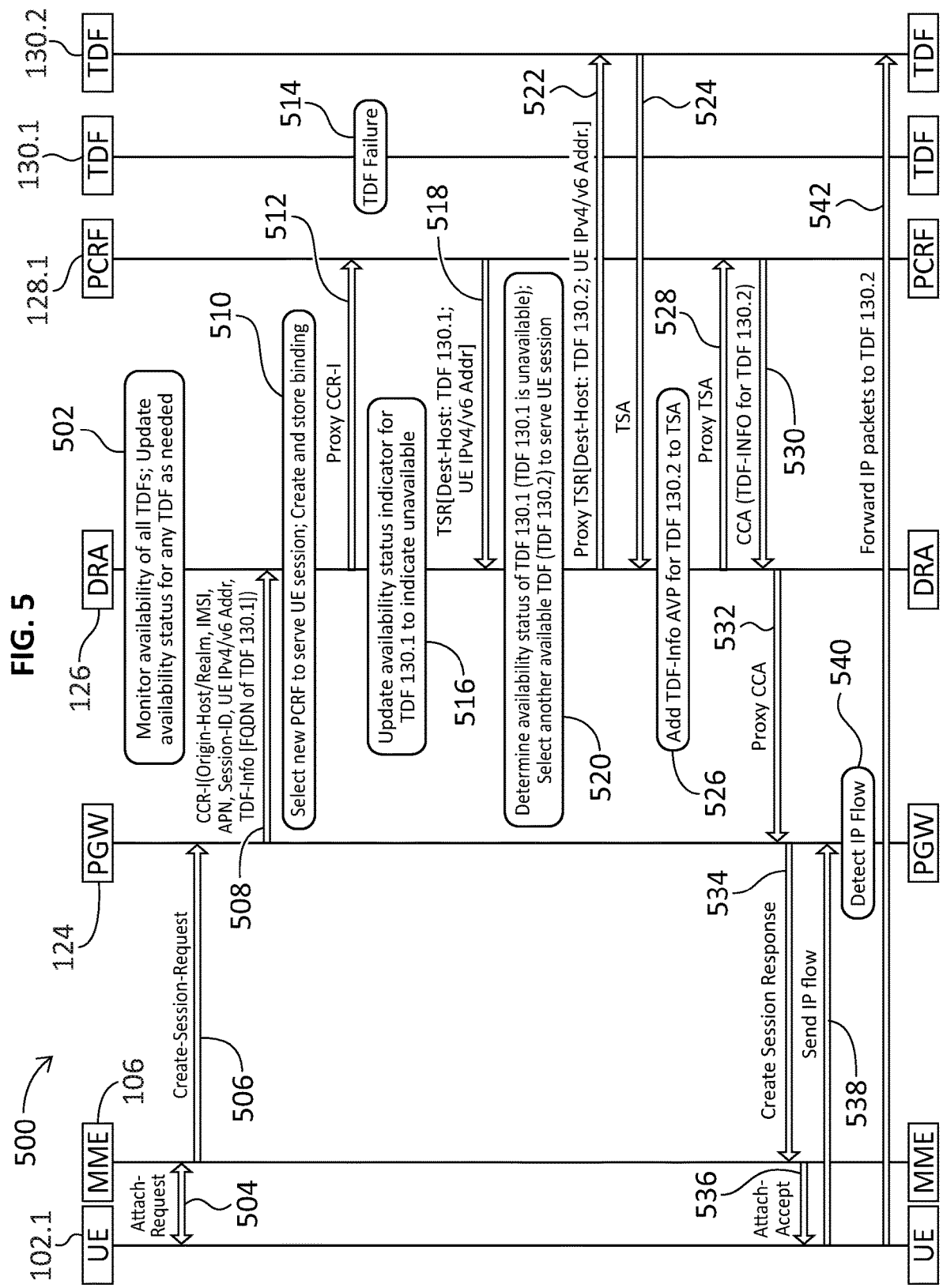
FIG. 5 is a simplified interaction diagram illustrating yet other example details that can be associated with network element failure detection and session restoration for another example call flow in accordance with one potential embodiment of the communication system.

Referring to FIG. 5, FIG. 5 is a simplified interaction diagram 500 illustrating yet other example details that can be associated with network element failure detection and session restoration for another example call flow in accordance with one potential embodiment of the communication system. In particular, the embodiment of FIG. 5 illustrates example details related to TDF failure detection and TDF re-direction (e.g., Rx session re-establishment) for a session associated with UE 102.1 for an Sd PUSH use case involving a given TDF (e.g., TDF 130.1). In particular, the embodiment of FIG. 5 illustrates example details for a use case in which operations are performed to re-establish the UE 102.1 session in a synchronous manner such that an Attach-Accept message is not communicated to UE 102.1 until a PGW-TDF data-plane path is established to handle traffic for the UE session. The embodiment of FIG. 5 includes UE 102.1, MME 106, PGW 124, DRA 126, PCRF 128.1, TDF 130.1 and TDF 130.2.

At 502 (and thereafter for the embodiment of FIG. 5), DRA 126 monitors the availability of TDFs 130.1-130.2 to handle UE sessions and updates an availability status indicator for any TDF as may be needed (e.g., to indicate that a PCRF is available or is not available to handle UE sessions). The monitoring at 502 can be performed using operations as discussed for various embodiments described herein and can be performed by the DRA throughout the operations and interactions discussed for the embodiment of FIG. 5. It is assumed for the purposes of the embodiment of FIG. 5 that DRA 126 only monitors and maintains TDF availability status information for the communication system; however, it should be understood that a DRA (e.g., DRA 126) can monitor and maintain availability status information for any number of network elements as configured by a network operator in accordance with various embodiments of communication system 100.

At 504, it is further assumed that UE 102.1 initiates an Attach-Request message toward MME 106 (e.g., via RF element 104) that includes the IMSI for the subscriber associated with UE 102.1 and, at 506, MME 106 sends a Create-Session-Request message to PGW 124 (e.g., via SGW 122) to create a session for UE 102.1 within the network. At 508, PGW 124 sends a Gx CCR-I message to DRA 126 that includes, among other information, an Origin-Host AVP and an Origin-Realm AVP for PGW 124, the IMSI for the subscriber associated with UE 102.1, an APN for the APN (e.g., PDN 170, IMS 140, etc.) to which UE 102.1 is seeking to connect, a Session-ID for the UE 102.1 session as generated by PGW 124, an IPv4 or IPv6 address (IPv4/v6 Addr.) assigned to UE 102.1 by PGW 124 and a TDF-Information (TDF-Info) AVP associated with TDF 130.1 including information that has been pre-configured for PGW 124. The TDF-Info AVP can include, among other information as defined by standards, a Fully Qualified Domain Name (FQDN) identifying TDF 130.1.

At 510, DRA 126 selects a PCRF to serve the UE 102.1 session and creates and stores a binding associating the PGW and the selected PCRF for the UE 102.1 session. For purposes of the embodiment of FIG. 5, it is assumed that DRA 126 selects PCRF 128.1 to handle the UE 102.1 session. DRA 126 proxies the CCR-I including the (Origin-Host/Realm, IMSI, APN, Session-ID, IPv4/v6 Addr, TDF-Info[FQDN or TDF 130.1]) to PCRF 128.1 at 512.

Recall, DRA 126 is continually monitoring the availability status of TDFs 130.1-130.2. At 514, it is assumed that a failure occurs for TDF 130.1. Following the failure, DRA 126 updates the availability status indicator for TDF 130.1 at 516 to indicate that TDF 130.1 is unavailable. It should be noted that the timing of the TDF failure as shown in the embodiment of FIG. 5 is provided for illustrative purposes only in order to discuss various features of communication system 100. It should be understood that a failure and/or recovery for a given TDF can occur at any time, can be detected by DRA 126 and the DRA can update the corresponding availability status indicator for the given TDF within the scope of the teachings discussed herein in this Specification.

At 518, PCRF 128.1 responds with a TDF-Session-Request (TSR) message including, among other information, a Destination-Host AVP identifying TDF 130.1 and the IPv4/v6 address for UE 102.1. At 520, DRA 126 determines the availability status for the Destination-Host (e.g., TDF 130.1). As noted, the availability status indicator for TDF 130.1 was set to indicate that the TDF is unavailable at 516; thus, DRA 126 determines at 520 that TDF 130.1 is unavailable, that a new TDF is to be selected to handle the UE session and selects TDF 130.2 to handle the UE 102.1 session. Upon selecting the TDF to handle the UE 102.1 session, at 522 DRA 126 proxies the TSR message received at 518 to TDF 130.2 including, among other information, a Destination-Host AVP identifying TDF 130.2 and the IPv4/v6 address for UE 102.1. At 524, TDF 130.2 responds to DRA 126 with a TDF-Session-Answer (TSA) message. DRA 126 adds a TDF-Info AVP associated with TDF 130.2 (e.g., Destination-Host AVP for TDF 130.2) to the TSA message at 526 and proxies the TSA message to PCRF 128.1 at 528.

At 530, PCRF 128.1 sends a RAR message to DRA 126 that includes, among other information, a TDF-Reconfiguration-Request indication including the TDF-Info AVP associated with TDF 130.2. DRA 126 proxies the RAR message to PGW 124 at 532. At 534, PGW 124 updates the TDF destination IP address to correspond to TDF 130.2 and sends a Create-Session-Response message to MME 106 and the MME sends an Attach-Accept message to UE 102.1 at 536.

Thereafter, it is assumed for the embodiment of FIG. 5 that UE 102.1 sends (538) an IP flow (e.g., packets) to PGW 124, the PGW detects the IP flow at 540 and forwards the IP packets to TDF 130.2 at 542. Accordingly, communication system 100 can facilitate TDF failure detection and Rx session re-establishment for a given UE session in a synchronous manner that is transparent to the UE such that the UE is not required to re-connect to the network following the TDF failure for Sd PUSH use cases in accordance with one potential embodiment.

Figure 6A:
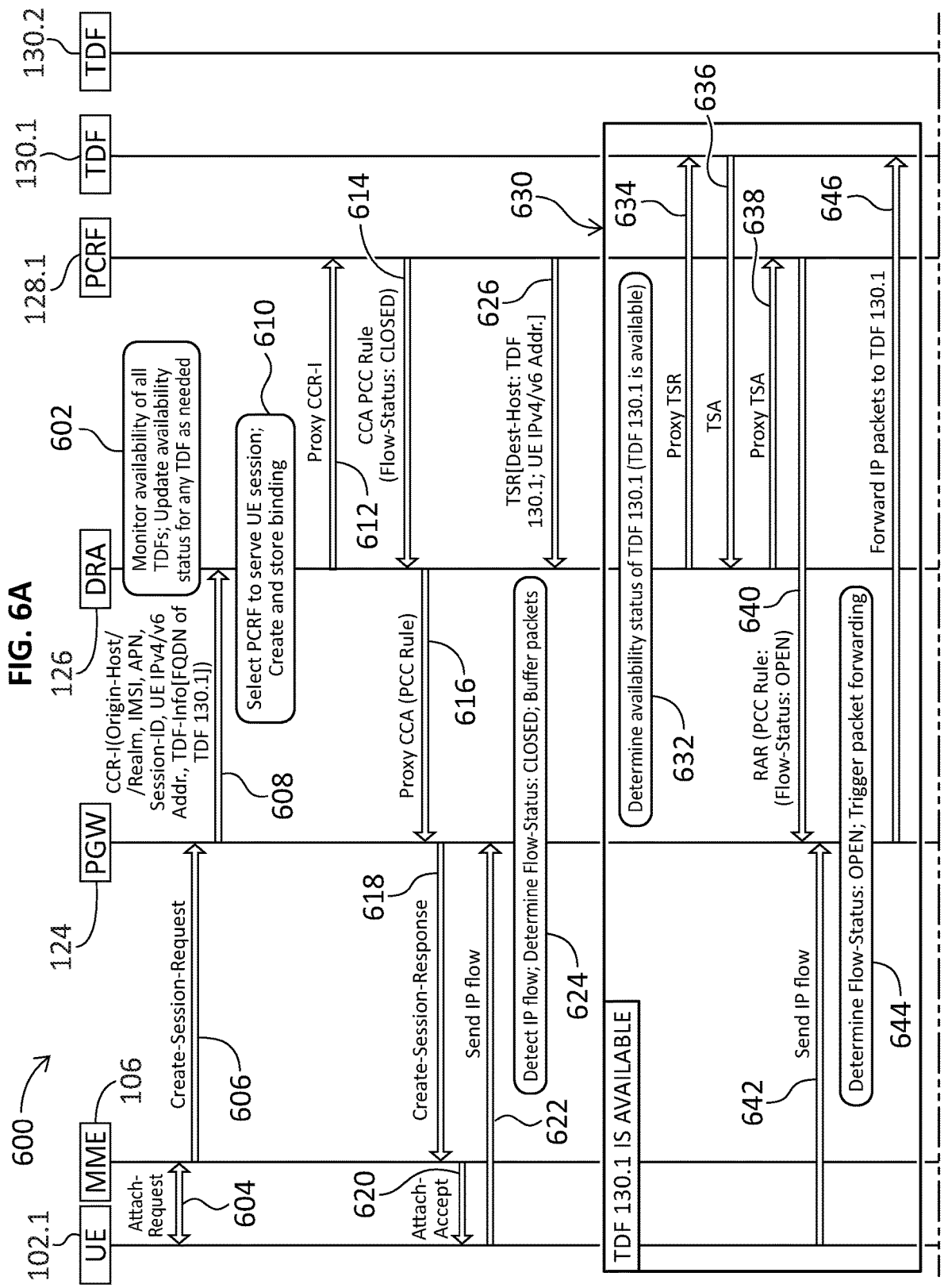
FIGS. 6A-6B are a simplified interaction diagram illustrating yet other example details that can be associated with network element failure detection and session restoration for another example call flow in accordance with one potential embodiment of the communication system.
Figure 6B:
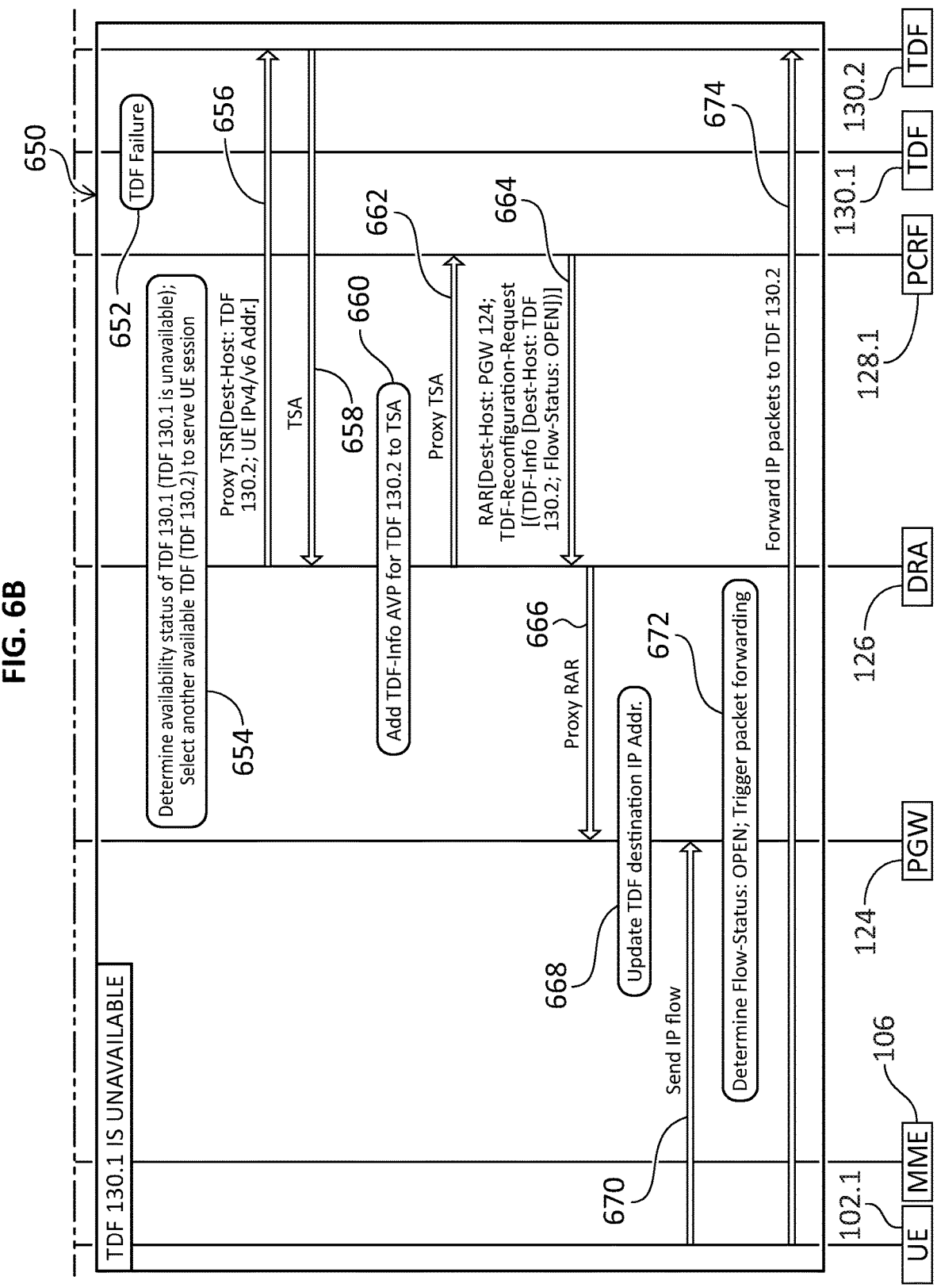

Referring to FIGS. 6A-6B, FIGS. 6A-6B are a simplified interaction diagram 600 illustrating yet other example details that can be associated with network element failure detection and session restoration for another example call flow in accordance with one potential embodiment of the communication system. In particular, the embodiment of FIGS. 6A-6B illustrates example details related to TDF failure detection and TDF re-direction (e.g., Rx session re-establishment) for a session associated with UE 102.1 for another Sd PUSH use case involving a given TDF (e.g., TDF 130.1). In particular, the embodiment of FIGS. 6A-6B illustrates example details for a use case in which operations are performed to re-establish the UE 102.1 session in a asynchronous manner such that an Attach-Accept message is communicated to UE 102.1 before a PGW-TDF data-plane path is established to handle traffic for the UE session. The embodiment of FIGS. 6A-6B includes UE 102.1, MME 106, PGW 124, DRA 126, PCRF 128.1, TDF 130.1 and TDF 130.2.

At 602 (and thereafter for the embodiment of FIGS. 6A-6B), DRA 126 monitors the availability of TDFs 130.1-130.2 to handle UE sessions and updates an availability status indicator for any TDF as may be needed (e.g., to indicate that a PCRF is available or is not available to handle UE sessions). The monitoring at 602 can be performed using operations as discussed for various embodiments described herein and can be performed by the DRA throughout the operations and interactions discussed for the embodiment of FIGS. 6A-6B. It is assumed for the purposes of the embodiment of FIGS. 6A-6B that DRA 126 only monitors and maintains TDF availability status information for the communication system; however, it should be understood that a DRA (e.g., DRA 126) can monitor and maintain availability status information for any number of network elements as configured by a network operator in accordance with various embodiments of communication system 100.

At 604, it is further assumed that UE 102.1 initiates an Attach-Request message toward MME 106 (e.g., via RF element 104) that includes the IMSI for the subscriber associated with UE 102.1 and, at 606, MME 106 sends a Create-Session-Request message to PGW 124 (e.g., via SGW 122) to create a session for UE 102.1 within the network. At 608, PGW 124 sends a Gx CCR-I message to DRA 126 that includes, among other information, an Origin-Host AVP and an Origin-Realm AVP for PGW 124, the IMSI for the subscriber associated with UE 102.1, an APN for the APN (e.g., PDN 170, IMS 140, etc.) to which UE 102.1 is seeking to connect, a Session-ID for the UE 102.1 session as generated by PGW 124, an IPv4 or IPv6 address (IPv4/v6 Addr.) assigned to UE 102.1 by PGW 124 and a TDF-Information (TDF-Info) AVP associated with TDF 130.1 including information that has been pre-configured for PGW 124. The TDF-Info AVP can include, among other information as defined by standards, a FQDN identifying TDF 130.1.

At 610, DRA 126 selects a PCRF to serve the UE 102.1 session and creates and stores a binding associating the PGW and the selected PCRF for the UE 102.1 session. For purposes of the embodiment of FIGS. 6A-6B, it is assumed that DRA 126 selects PCRF 128.1 to handle the UE 102.1 session. DRA 126 proxies the CCR-I including the (Origin-Host/Realm, IMSI, APN, Session-ID, IPv4/v6 Addr, TDF-Info[FQDN or TDF 130.1]) to PCRF 128.1 at 612.

For the embodiment of FIGS. 6A-6B, PCRF 128 responds to the CCR-I with a CCA message at 614 that can include, among other information, a PCC rule indicating that the flow status is CLOSED for any flows associated with the UE 102.1 session. A flow status indication of CLOSED can be used to indicate to the PGW serving the UE session that it is to buffer any packets received from the UE for the session until it receives a flow status indication of OPEN, which can indicate to the PGW that it can forward the buffered packets to a given TDF. At 616, DRA 126 proxies the CCA to PGW 124. At 618, PGW 124 sends a Create-Session-Response message to MME 106 and the MME sends an Attach-Accept message to UE 102.1 at 620.

Thereafter, it is assumed for the embodiment of FIGS. 6A-6B that UE 102.1 sends (622) an IP flow (e.g., packets) to PGW 124. At 624, PGW 124 detects the IP flow, determines that the flow status associated with the UE 102.1 session is set to CLOSED and buffers the packets. At 626, PCRF 128.1 sends DRA 126 a TSR message including, among other information, a Destination-Host AVP identifying TDF 130.1 and the IPv4/v6 address for UE 102.1.

The embodiment of FIGS. 6A-6B illustrates operations (630) that can be associated with an example use case in which it is assumed that TDF 130.1 is reachable (e.g., available) to handle packets for the UE 102.1 session and other operations (650) that can be associated with an example use case in which it is assumed that TDF 130.1 is not reachable (e.g., unavailable) to handle packets for the UE 102.1 session. Recall, DRA 126 is continually monitoring the availability status of TDFs 130.1-130.2.

For operations (630), it is assumed DRA 126 determines at 632 that the availability status for TDF 130.1 indicates that TDF 130.1 is available. As no failure of TDF 130.1 is detected by DRA 126, the DRA determines at 632 that TDF 130.1 is available to handle traffic for the UE 102.1 session and, at 634, proxies to TDF 130.1 the TSR that was received (626) from PCRF 128.1 that includes, among other information, the Destination-Host AVP identifying TDF 130.1 and the IPv4/v6 address for UE 102.1. At 636, TDF 130.1 responds with a TSA, which DRA proxies (638) to PCRF 128.1.

At 640, PCRF 128.1 sends an RAR message to DRA 126 including among other information, PCC rules indicating that the flow status is to be set to OPEN for any flows associated with the UE 102.1 session and the DRA proxies the RAR to PGW 124. At 642 it is assumed that PGW 124 receives additional packets for the IP flow. At 644, PGW 124 determines the flow status for the UE 102.1 session is set to OPEN, which triggers the PGW to forward the received and any buffered packets to TDF 130.1 at 646.

For operations (650), it is assumed at 652 that a failure occurs for TDF 130.1 at 652. Following the failure, DRA 126 updates the availability status indicator for TDF 130.1 at 654 to indicate that TDF 130.1 is unavailable, which triggers a determination at DRA 126 for the Destination-Host as was identified in the TSR received at 626 (e.g., identifying TDF 130.1) that the TDF 130.1 is unavailable and DRA 126 selects TDF 130.2 to handle the UE 102.1 session. It should be noted that the timing of the TDF failure as shown in the embodiment of FIGS. 6A-6B is provided for illustrative purposes only in order to discuss various features of communication system 100. It should be understood that a failure and/or recovery for a given TDF can occur at any time, can be detected by DRA 126 and the DRA can update the corresponding availability status indicator for the given TDF within the scope of the teachings discussed herein in this Specification.

Upon selecting the TDF to handle the UE 102.1 session, at 656 DRA 126 proxies the TSR message received at 626 to TDF 130.2 including, among other information, a Destination-Host AVP identifying TDF 130.2 and the IPv4/v6 address for UE 102.1. At 658, TDF 130.2 responds to DRA 126 with a TSA message. DRA 126 adds a TDF-Info AVP associated with TDF 130.2 (e.g., Destination-Host AVP for TDF 130.2) to the TSA message at 660 and proxies the TSA message to PCRF 128.1 at 662.

At 664, PCRF 128.1 sends a RAR message to DRA 126 that includes, among other information, the Destination-Host AVP identifying PGW 124, a TDF-Reconfiguration-Request indication including the TDF-Info AVP associated with TDF 130.2 and PCC rules indicating that the flow status is to be set to OPEN for any flows associated with the UE 102.1 session. DRA 126 proxies the RAR message to PGW 124 at 666. At 668, PGW 124 updates the TDF destination IP address to correspond to TDF 130.2. At 670, it is assumed that PGW 124 receives additional packets for the IP flow from UE 102.1. At 672, PGW 124 determines the flow status for the UE 102.1 session is set to OPEN, which triggers the PGW to forward the received and any buffered packets to TDF 130.2 at 674. Accordingly, communication system 100 can facilitate TDF failure detection and Rx session re-establishment for a given UE session in an asynchronous manner that is transparent to the UE such that the UE is not required to re-connect to the network following the TDF failure for Sd PUSH use cases in accordance with one potential embodiment.

Figure 7:
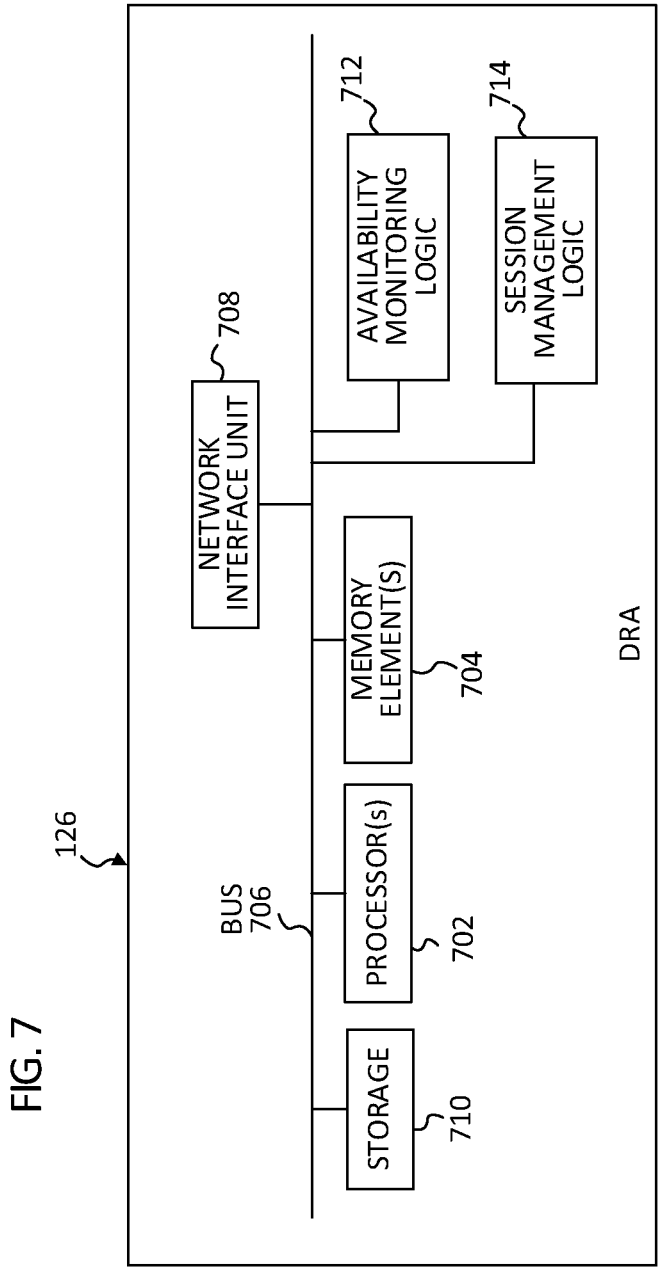
FIG. 7 is a simplified block diagram illustrating example details that can be associated with the communication system.

Referring to FIG. 7, FIG. 7 is a simplified block diagram illustrating example details that can be associated with DRA 126 in accordance with various embodiments of communication system 100. As illustrated for the embodiment of FIG. 7, DRA 126 can include at least one processor(s) 702, at least one memory element(s) 704, a bus 706, a network interface unit 708, storage 710, availability monitoring logic 712 and session management logic 714.

In at least one embodiment, processor(s) 702 is/are at least one hardware processor configured to execute various tasks, operations and/or functions for DRA 126 as described herein according to software and/or instructions configured for DRA 126. In at least one embodiment, memory element(s) 704 and/or storage 710 is/are configured to store data, information, software and/or instructions associated with DRA 126 and/or logic configured for memory element(s) 704 and/or storage 710. In at least one embodiment, bus 706 can be configured as an interface that enables one or more elements of DRA 126 (e.g., network interface unit 708, processor(s) 702, memory element(s) 704, logic, etc.) to communicate in order to exchange information and/or data. In at least one embodiment, a fast kernel-hosted interconnect may be employed for DRA 126, potentially using shared memory between processes (e.g., logic), which can enable efficient communication paths between the processes.

In various embodiments, network interface unit 708 enables communication between DRA 126, and other network elements and/or nodes (e.g., PCRFs 128.1-128.2, HSS 132, AF 142, PGW 124 and TDFs 130.1-130.2) to facilitate operations discussed for various embodiments described herein. In some embodiments, network interface unit 708 can be configured with one or more Ethernet driver(s), Fibre Channel driver(s) and/or controller(s) or other similar network interface driver(s) and/or controller(s) to enable communications for DRA 126 within communication system 100. In various embodiments storage 710 and/or memory element(s) 704 can be configured to store data, information, software and/or instructions associated with DRA 126 and/or logic configured for DRA 126.

In various embodiments, storage 710 and/or memory element(s) 704 can be configured to store: Origin and Destination Host/Realm information for one or more Diameter hosts and destinations with which DRA 126 can interface; binding and/or interface information associated with UE sessions and the network elements associated with the sessions (e.g., Session-IDs, Host/Realm AVPs, IP addresses, UE and/or subscriber IDs, FQDNs, APNs, any other AVPs, etc.); any other interface information availability status indicators and IDs for network elements (e.g., PCRFs, TDFs, etc.) being monitored by DRA 126; flow status information; logic; any other interface information, any other data, information, software and/or instructions as discussed for various embodiments described herein (e.g., logic can be stored in memory element(s) 704 and/or storage 710); combinations thereof or the like. Note that in some embodiments, storage can be consolidated with memory elements (or vice versa), or can overlap/exist in any other suitable manner.

In various embodiments, availability monitoring logic 712 can include instructions that, when executed (e.g., by processor(s) 702) cause DRA 126 to perform network element availability monitoring operations, which can include, but not be limited to: monitoring the availability of one or more network element types (e.g., PCRFs, TDFs, etc.) that interfaces with DRA 126; maintaining (e.g., updating) an availability status indicator for each network element associated with each network element type that DRA 126 monitors based on whether each network element is or is not available; combinations thereof and/or any other operations as discussed for various embodiments described herein.

In various embodiments, session management logic 712 can include instructions that, when executed (e.g., by processor(s) 702) cause DRA 126 to perform UE session management operations, which can include, but not be limited to: selecting a network element to serve a given UE session during session creation, bearer modifications/updates, etc. in order to re-establish a Gx and/or an Rx session based, at least in part, on availability status indicators of the network elements associated with the UE session; creating, storing and/or retrieving session bindings for UE sessions; combinations thereof and/or any other operations as discussed for various embodiments described herein.

In regards to the internal structure associated with communication system 100, each of respective UE 102.1, UE 102.2, RF element 104, MME 106, SGW 122, PGW 124, PCRF 128.1-128.2, TDF 130.1, TDF 130.2, HSS 132 and AF 142 can also include respective at least one processor(s), respective at least one memory element(s), respective at least one storage, a respective network interface unit, respective logic, combinations thereof or the like to facilitate network element failure detection and UE session restoration operations in a network environment. Hence, appropriate software, hardware and/or algorithms are being provisioned for communication system 100 in order to facilitate operations as discussed for various embodiments described herein to facilitate network element failure detection and UE session restoration operations in a network environment.

In various example implementations, UE 102.1, UE 102.2, RF element 104, MME 106, SGW 122, PGW 124, DRA 126, PCRF 128.1-128.2, TDF 130.1, TDF 130.2, HSS 132 and/or AF 142 discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1). In various embodiments, one or more of UE 102.1, UE 102.2, RF element 104, MME 106, SGW 122, PGW 124, DRA 126, PCRF 128.1-128.2, TDF 130.1, TDF 130.2, HSS 132 and/or AF 142 discussed herein can include software (or reciprocating software) that can coordinate in order to achieve operations associated with providing network element failure detection and UE session restoration in a network environment as discussed herein and may include any suitable algorithms, hardware, software, components, modules, logic, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, UE 102.1, UE 102.2, RF element 104, MME 106, SGW 122, PGW 124, DRA 126, PCRF 128.1-128.2, TDF 130.1, TDF 130.2, HSS 132 and/or AF 142 discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of UE 102.1, UE 102.2, RF element 104, MME 106, SGW 122, PGW 124, DRA 126, PCRF 128.1-128.2, TDF 130.1, TDF 130.2, HSS 132 and/or AF 142 discussed herein could be provided in any database, register, control list, cache, storage and/or storage structure: all of which can be referenced at any suitable timeframe. Any such storage options may also be included within the broad term 'memory element' as used herein. Any of potential processing elements, controllers, managers, logic and/or machines described herein can be construed as being encompassed within the broad term 'processor'. In various embodiments, each of UE 102.1, UE 102.2, RF element 104, MME 106, SGW 122, PGW 124, DRA 126, PCRF 128.1-128.2, TDF 130.1, TDF 130.2, HSS 132 and/or AF 142 discussed herein can also include suitable interfaces for receiving, transmitting, and/or otherwise communicating data or information in a network environment.

Note that in certain example implementations, operations as outlined herein to facilitate network element failure detection and UE session restoration in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIG. 7] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIG. 7] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, machine, compute node combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

We claim:
1. A method comprising:
   maintaining, by a Diameter Routing Agent (DRA), an availability status for a plurality of Policy and Charging Rules Functions (PCRFs);
   receiving a request associated with a user equipment (UE) session, wherein a first PCRF of the plurality of PCRFs is serving the UE session;
   determining that the first PCRF serving the UE session is unavailable; and
   re-establishing the UE session at a second PCRF of the plurality of PCRFs that is available, wherein the re-establishing is performed without terminating the UE session, comprising:

transmitting from the DRA to a Packet Data Network (PDN) Gateway (PGW) a request comprising a first session identifier identifying a first session between the UE and the first PCRF;

receiving at the DRA a response from the PGW comprising a second session identifier identifying a second session between the UE and the second PCRF, wherein the first session identifier is different than the second session identifier; and transmitting to the second PCRF a message comprising the second session identifier.

2. The method of claim 1, wherein the request is at least one of:
   an initial Credit-Control-Request (CCR-I) message received by the DRA via a Gx interface;
   an update Credit-Control-Request (CCR-U) message received by the DRA via a Gx interface;
   an initial Credit-Control-Request (CCR-I) message received by the DRA via an Sd interface;
   an Authorization-and-Authentication-Request (AAR) message received by the DRA via an Rx interface; and
   a TDF-Session-Request (TSR) message received by the DRA via an Sd interface.

3. The method of claim 1, wherein the determining further comprises:
   determining a respective availability status for each respective PCRF of the plurality of PCRFs based on a determination that the first PCRF serving the UE session is unavailable; and
   selecting the second PCRF to serve the UE session based, at least in part, on the respective availability status of the second PCRF indicating that it is available.

4. The method of claim 1, wherein the request comprises a Gx Re-Authorization-Request (RAR) message and the PGW serves the UE session.

5. The method of claim 1, wherein the request is a TDF-Session-Request (TSR) message received by the DRA from PCRF.

6. The method of claim 1, wherein the PGW is configured to generate the second session identifier in response to receiving the request from the DRA.

7. The method of claim 4, wherein the message comprising the second session identifier comprises an initial Credit-Control-Request (CCR-I) message.

8. The method of claim 5, further comprising:
   causing packets for the UE session to be buffered at the PGW until an indication is received at the PGW indicating that the PGW is to forward the packets to the second PCRF.

9. One or more non-transitory tangible media encoding logic that includes instructions for execution by a processor, wherein the execution causes the processor to perform operations comprising:
   maintaining, by a Diameter Routing Agent (DRA), an availability status for a plurality of Policy and Charging Rules Functions (PCRFs);
   receiving a request associated with a user equipment (UE) session, wherein a first PCRF of the plurality of PCRFs is serving the UE session;
   determining that the first PCRF serving the UE session is unavailable; and
   re-establishing the UE session at a second PCRF of the plurality of PCRFs that is available, wherein the re-establishing is performed without terminating the UE session, comprising:
      transmitting from the DRA to a Packet Data Network (PDN) Gateway (PGW) a request comprising a first session identifier identifying a first session between the UE and the first PCRF;
      receiving at the DRA a response from the PGW comprising a second session identifier identifying a second session between the UE and the second PCRF, wherein the first session identifier is different than the second session identifier; and
      transmitting to the second PCRF a message comprising the second session identifier.

10. The media of claim 9, wherein the request is at least one of:
    an initial Credit-Control-Request (CCR-I) message received by the DRA via a Gx interface;
    an update Credit-Control-Request (CCR-U) message received by the DRA via a Gx interface;
    an initial Credit-Control-Request (CCR-I) message received by the DRA via an Sd interface;
    an Authorization-and-Authentication-Request (AAR) message received by the DRA via an Rx interface; and
    a TDF-Session-Request (TSR) message received by the DRA via an Sd interface.

11. The media of claim 9, wherein the determining further comprise:
    determining a respective availability status for each respective PCRF of the plurality of PCRFs based on a determination that the first PCRF serving the UE session is unavailable; and
    selecting the second PCRF to serve the UE session based, at least in part, on the respective availability status of the second PCRF indicating that it is available.

12. The media of claim 9, wherein the request comprises a Gx Re-Authorization-Request (RAR) message, the PGW serves the UE session, and the message comprising the second session identifier comprises an initial Credit-Control-Request (CCR-I) message.

13. The media of claim 9, wherein the request is a TDF-Session-Request (TSR) message received by the DRA from a PCRF.

14. The media of claim 9, wherein the PGW is configured to generate the second session identifier in response to receiving the request from the DRA.

15. The media of claim 13, wherein the execution causes the processor to perform further operations comprising:
    causing packets for the UE session to be buffered at the PGW until an indication is received at the PGW indicating that the PGW is to forward the packets to the second PCRF.

16. A Diameter Routing Agent comprising:
    at least one memory element for storing data; and
    at least one processor to execute instructions associated with the data, wherein executing the instructions causes the Diameter Routing Agent (DRA) to perform operations comprising:
       maintaining, by the DRA, an availability status for a plurality of Policy and Charging Rules Functions (PCRFs);
       receiving a request associated with a user equipment (UE) session, wherein a first PCRF of the plurality of PCRFs is serving the UE session;
       determining that the first PCRF serving the UE session is unavailable; and
       re-establishing the UE session at a second PCRF of the plurality of PCRFs that is available, wherein the re-establishing is performed without terminating the UE session, comprising:
          transmitting from the DRA to a Packet Data Network (PDN) Gateway (PGW) a request comprising a first session identifier identifying a first session between the UE and the first PCRF;

receiving at the DRA a response from the PGW comprising a second session identifier identifying a second session between the UE and the second PCRF, wherein the first session identifier is different than the second session identifier; and transmitting to the second PCRF a message comprising the second session identifier.

17. The Diameter Routing Agent of claim 16, wherein the request is at least one of:

an initial Credit-Control-Request (CCR-I) message received by the DRA via a Gx interface;

an update Credit-Control-Request (CCR-U) message received by the DRA via a Gx interface;

an initial Credit-Control-Request (CCR-I) message received by the DRA via an Sd interface;

an Authorization-and-Authentication-Request (AAR) message received by the DRA via an Rx interface; and a TDF-Session-Request (TSR) message received by the DRA via an Sd interface.

18. The Diameter Routing Agent of claim 16, wherein the determining further comprises:

determining a respective availability status for each respective PCRF of the plurality of PCRFs based on a determination that the first PCRF serving the UE session is unavailable; and selecting the second PCRF to serve the UE session based, at least in part, on the respective availability status of the second PCRF indicating that it is available.

19. The Diameter Routing Agent of claim 16, wherein the request comprises a Gx Re-Authorization-Request (RAR) message and the PGW serves the UE session.

20. The Diameter Routing Agent of claim 16, wherein the PGW is configured to generate the second session identifier in response to receiving the request from the DRA.

* * * * *